(12) United States Patent
Tamura et al.

(10) Patent No.: US 9,731,572 B2
(45) Date of Patent: Aug. 15, 2017

(54) SUSPENSION DEVICE FOR AN IN-WHEEL MOTOR DRIVEN WHEEL

(71) Applicant: Nissan Motor Co., Ltd., Yokohama-shi, Kanagawa (JP)

(72) Inventors: Jun Tamura, Zama (JP); Tomoki Hirabayashi, Kamakura (JP); Yutaka Matayoshi, Yokosuka (JP); Sakiko Suzuki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 86 days.

(21) Appl. No.: 14/781,162

(22) PCT Filed: Mar. 31, 2014

(86) PCT No.: PCT/JP2014/059451
§ 371 (c)(1),
(2) Date: Sep. 29, 2015

(87) PCT Pub. No.: WO2014/178250
PCT Pub. Date: Nov. 6, 2014

(65) Prior Publication Data
US 2016/0052356 A1  Feb. 25, 2016

(30) Foreign Application Priority Data

Apr. 30, 2013  (JP) ................................. 2013-095798

(51) Int. Cl.
*B60K 1/00* (2006.01)
*B60G 3/20* (2006.01)
(Continued)

(52) U.S. Cl.
CPC ............. *B60G 3/20* (2013.01); *B60G 15/062* (2013.01); *B60K 7/0007* (2013.01); *B62D 7/18* (2013.01);
(Continued)

(58) Field of Classification Search
CPC ............. B60L 2200/44; B60L 2200/46; B60K 7/0007; B60K 7/00; B62D 7/18;
(Continued)

(56) References Cited

U.S. PATENT DOCUMENTS 6,585,276 B2 *  7/2003  Boucquey ................ B60G 3/20
280/124.135
7,118,119 B2 * 10/2006  Amanuma ............... B60G 3/20
180/65.51
(Continued)

FOREIGN PATENT DOCUMENTS

JP  3-112724 A  5/1991
JP  2004-122953 A  4/2004
(Continued)

*Primary Examiner* — James M Dolak
(74) *Attorney, Agent, or Firm* — Global IP Counselors, LLP

(57) ABSTRACT

A suspension device for an in-wheel motor driven wheel ensures a lever ratio and stroke of a shock absorber without setting the upper end portion of the shock absorber at a high position. A wheel driven by an in-wheel motor unit is suspended on a vehicle body via a suspension structure member and a shock absorber, the suspension structure member including an upper suspension arm pivotally supported with respect to the vehicle body, and a third link. The third link pivotally connects the upper suspension arm to the wheel while having a shock absorber connecting portion to which the lower end of the shock absorber is connected. Further, the shock absorber connecting portion is disposed in the vehicle bottom position lower than an upper end surface of the in-wheel motor unit.

21 Claims, 14 Drawing Sheets

(51) Int. Cl.
*B60G 15/06* (2006.01)
*B62D 7/18* (2006.01)
*B60K 7/00* (2006.01)

(52) U.S. Cl.
CPC .. *B60G 2200/144* (2013.01); *B60G 2200/422* (2013.01); *B60G 2200/44* (2013.01); *B60G 2204/129* (2013.01); *B60G 2204/1484* (2013.01); *B60G 2204/182* (2013.01); *B60G 2204/421* (2013.01); *B60G 2204/422* (2013.01); *B60G 2300/50* (2013.01)

(58) Field of Classification Search
CPC ........ B62D 7/00; B60G 15/062; B60G 15/02; B60G 15/06; B60G 15/00; B60G 3/20; B60G 3/00
See application file for complete search history.

(56) References Cited

U.S. PATENT DOCUMENTS

| | | | | |
|---|---|---|---|---|
| 7,216,731 B2 * | 5/2007 | Kakinami | ............... | B60K 7/00 180/65.1 |
| 7,413,203 B2 * | 8/2008 | Kurata | ............... | B60K 7/0007 180/65.51 |
| 7,537,071 B2 * | 5/2009 | Kamiya | ............... | B60G 3/20 180/298 |
| 7,735,588 B2 * | 6/2010 | Murata | ............... | B60G 3/20 180/65.51 |
| 7,958,959 B2 * | 6/2011 | Yogo | ............... | B60G 3/20 180/65.51 |
| 8,444,160 B2 * | 5/2013 | Okamoto | ............... | B60G 3/20 280/124.135 |
| 8,453,774 B2 * | 6/2013 | Nagaya | ............... | B60G 3/01 180/65.51 |
| 8,863,874 B2 * | 10/2014 | Lee | ............... | B60K 7/0007 180/65.51 |
| 8,910,735 B2 * | 12/2014 | Kawasaki | ............... | B60K 7/0007 180/65.51 |
| 9,145,050 B2 * | 9/2015 | Kawasaki | ............... | B60K 7/0007 |
| 9,604,531 B2 * | 3/2017 | Tamura | ............... | B60K 7/0007 |
| 9,616,724 B2 * | 4/2017 | Ariga | ............... | B60G 7/001 |
| 9,643,527 B2 * | 5/2017 | Uranaka | ............... | B60G 3/20 |
| 9,649,923 B2 * | 5/2017 | Perlo | ............... | B60K 1/02 |
| 2009/0133944 A1 * | 5/2009 | Nishioka | ............... | B60G 3/20 180/65.51 |

FOREIGN PATENT DOCUMENTS

| | | |
|---|---|---|
| JP | 2004-161157 A | 6/2004 |
| JP | 2008-168804 A | 7/2008 |
| JP | 2009-202606 A | 9/2009 |
| JP | 2010-228544 A | 10/2010 |
| JP | 2013-144509 A | 7/2013 |

\* cited by examiner

SUSPENSION DEVICE FOR AN IN-WHEEL MOTOR DRIVEN WHEEL

CROSS-REFERENCE TO RELATED APPLICATIONS

This application is a U.S. National stage application of International Application No. PCT/JP2014/059451, filed Mar. 31, 2014, which claims priority based on Japanese Patent Application No. 2013-095798, filed in Japan Patent Office on Apr. 30, 2013, the contents of each of which is hereby incorporated herein by reference.

BACKGROUND

Field of the Invention

The present invention relates to a suspension device for an in-wheel motor driven wheel, in which a wheel driven by an in-wheel motor is suspended on a vehicle body through a suspension structure member and a shock absorber.

Background Information

Conventionally, a suspension device for an in-wheel motor driven wheel is known, in which a knuckle is divided into a first knuckle and a second knuckle. The first knuckle is fixed in the steering direction while being connected to the in-wheel motor unit for driving a wheel. The second knuckle is connected to a steering rod and mounted on the wheel (see JP2004-122593A).

SUMMARY

However, in the conventional suspension device for an in-wheel motor driven wheel, the upper end of the first knuckle is supported by an upper suspension arm pivotally connected to a vehicle body and the lower end of the first knuckle is supported by a lower suspension arm pivotally connected to the vehicle body. Further, the lower suspension arm is pivotally supported in a vertical direction by the lower end of a shock absorber. Thus, the in-wheel motor unit will be disposed between the first knuckle and the shock absorber. Therefore, in order to ensure an arrangement space for the in-wheel motor unit, the connecting position between the lower end of the shock absorber and the lower suspension arm is required to be away from the addition, the vehicle body-side end of the lower suspension arm is normally arranged in the vehicle upper position higher than the wheel-side end thereof. Thus, when the connecting position of the lower end of the shock absorber and the lower suspension arm is shifted to the side of the vehicle body, the lower end of the shock absorber will be placed in the upper part of the vehicle. Therefore, when the entire length of the shock absorber is maintained, the upper end of the shock absorber will protrude, while, when shortening the entire length of the shock absorber, a problem of insufficient stroke will come up.

The present invention has been made in view of the problem described above, and aims to provide a suspension device for an in-wheel motor driven wheel, which can secure the lever ratio and stroke of the shock absorber without setting an upper end of the shock absorber at a high position.

In order to achieve the above object, in a suspension device for an in-wheel motor driven wheel according to the present invention, the wheel which is driven by an in-wheel motor unit is suspended on a vehicle body via a shock absorber and a suspension structure member which includes a suspension arm and a link member. The suspension arm is swivel or pivotally supported to the vehicle body. The link member pivotally connects the wheel to the suspension arm and includes a shock absorber connecting portion connected to the lower end of the shock absorber. Further, the shock absorber connecting portion is placed in the vehicle bottom position lower than the upper end portion of the in-wheel motor unit.

According to the present invention, the suspension arm and the shock absorber are connected with respect to the wheel via a link member that generally follows the movement of the wheel. Thus, a force that is input from the wheel and applied to the suspension arm is controlled substantially to the same level of a force that is input from the wheel and applied to the shock absorber. In other words, in order to secure an accommodating space for the in-wheel motor unit, even when the lower end of the shock absorber is disposed on the vehicle body side, away from the wheel center of the wheel, the lever ration may be maintained roughly at "1". Thus, it is possible to prevent the lever ratio of the shock absorber from being deteriorated. In addition, the shock absorber connecting portion that represents a connecting position between the link member and the lower end of the shock absorber is disposed in the vehicle bottom position lower than the upper end portion of the in-wheel motor unit. Thus, it is possible for the supporting position of the shock absorber to be set in a relatively lower position. Therefore, without relying on elevating the upper end position of the shock absorber, it is possible to dimension the entire length of the shock absorber to thereby secure the required stroke. Consequently, without setting the upper end portion of the shock absorber at a high position, the lever ratio of the shock absorber and the stroke may be ensured.

BRIEF DESCRIPTION OF THE DRAWINGS

Referring now to the attached drawings which form a part of this original disclosure.

DETAILED DESCRIPTION OF THE EMBODIMENTS

Below, a description is given of embodiments for implementing a suspension device for an in-wheel motor driven wheel according to the present invention based on a first to fifth embodiments with reference to accompanying drawings.

First Embodiment

First, a configuration is described. A description is given of the configuration of a suspension device mounted on an in-wheel motor driven wheel (suspension device for in-wheel motor driven wheel) in the first embodiment in the "overall configuration", "configuration of a suspension structure member", and "configuration of a third link", separately.

Overall Configuration

Figure 1:
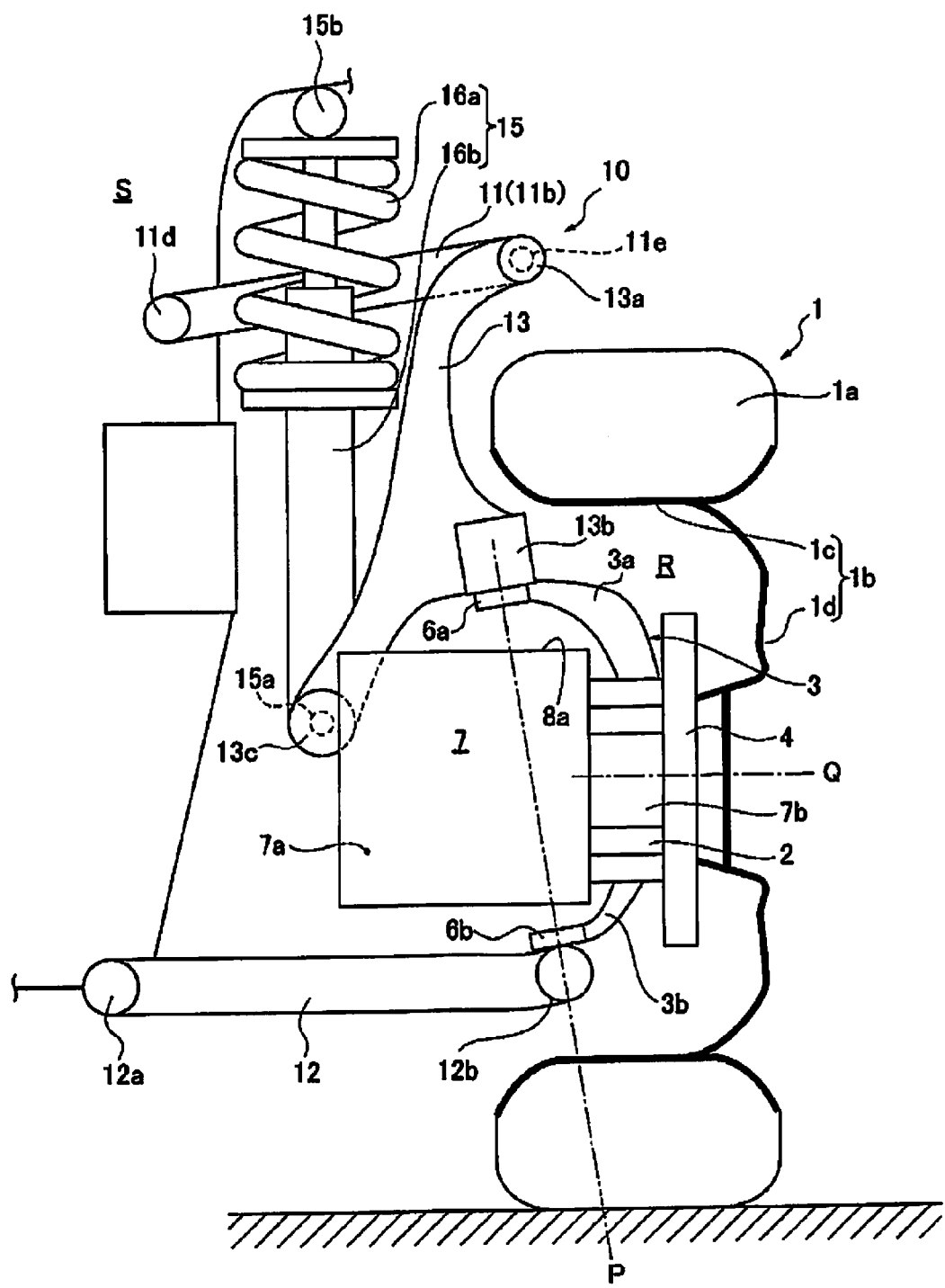
FIG. 1 is a front view of an in-wheel motor driven wheel, when viewed from the front of the vehicle, to which a suspension device of a first embodiment is applied.
Figure 2:
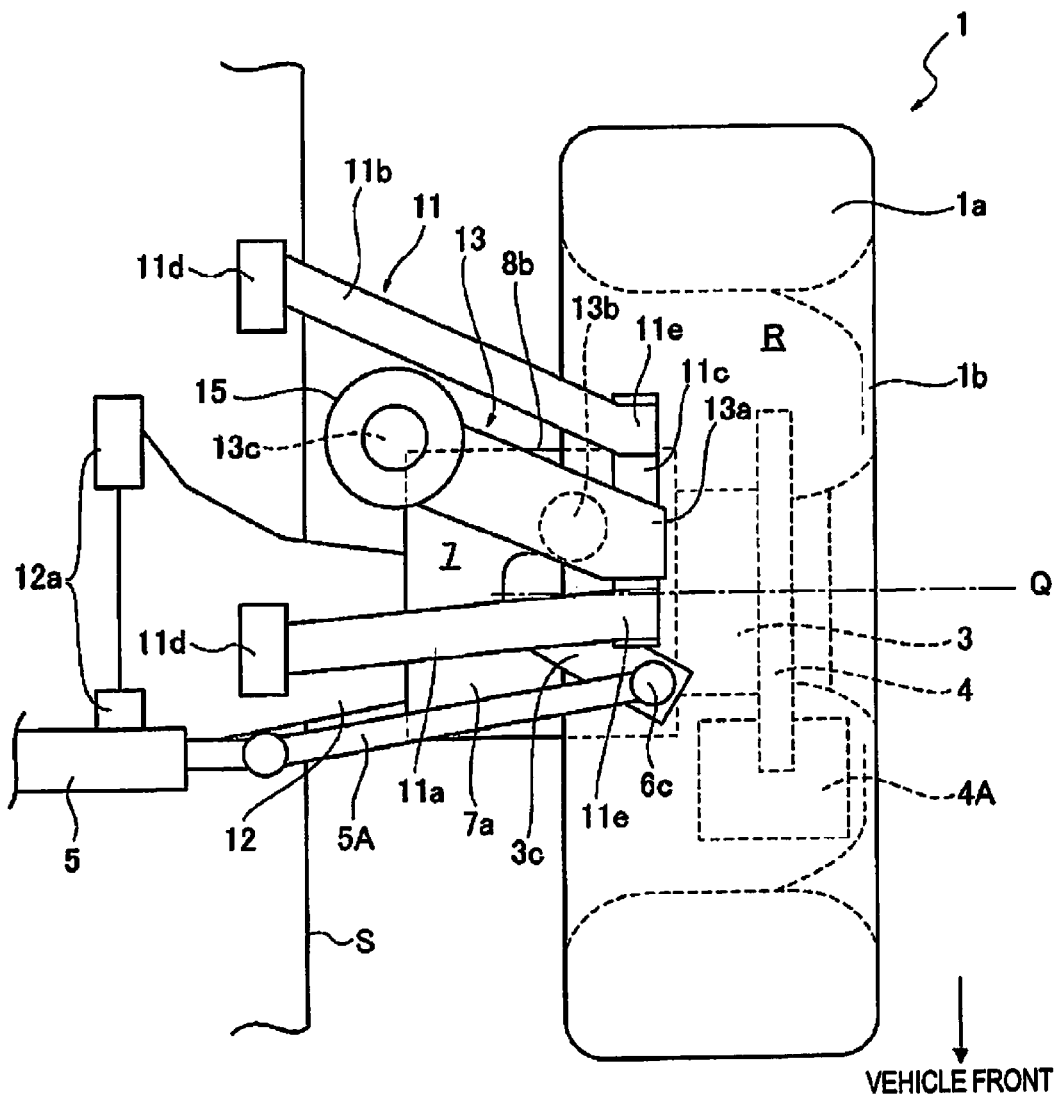
FIG. 2 is a plan view of an in-wheel motor driven wheel, when viewed from the top of the vehicle, to which a suspension device of the first embodiment is applied.

FIG. 1 is a front view of an in-wheel motor driven wheel, when viewed from the front of the vehicle, to which a suspension device of a first embodiment is applied. FIG. 2 is a plan view of an in-wheel motor driven wheel, when viewed from the top of the vehicle, to which a suspension device of the first embodiment is applied. Note that FIGS. 1 and 2 illustrate a straight traveling state where the wheels are not steered. Below, referring to FIG. 1, the overall configuration or structure of a suspension device of the first embodiment is described.

A wheel 1 arranged in the front-right side of the vehicle body S shows a front steered wheel including a tire 1a and a wheel portion 1b on the outer periphery of which the tire 1a is mounted. The wheel portion 1b includes a rim 1c to support the tire 1a and a disk-shaped wheel disc 1d positioned in the center of the rim 1c. The wheel 1 is rotatably connected to an output shaft 7b of the in-wheel motor unit 7 through a hub 2 attached to the wheel disc 1d and is rotatable about the axle Q.

A knuckle 3 is mounted to the hub 2, and a brake disk 4 is mounted between the hub 2 and the wheel disc 1d. The brake disk 4 imparts a braking force to the wheel by being pressurized from both sides in the lateral direction by a brake caliper 4A (see FIG. 2) fixed to the knuckle 3.

Further, the knuckle 3 has an upper bracket 3a (FIG. 1) extending in the vehicle upward direction, a lower bracket 3b (FIG. 1) extending in the vehicle downward direction, and a steering bracket 3c (FIG. 2) extending in the vehicle forward direction from the upper portion. The upper bracket 3a is formed at its tip with a kingpin rotating portion 6a that is rotatably supported in a steering direction (about the kingpin axis P) by the suspension structure member 10. The lower bracket 3b is formed at its tip with a kingpin rotating portion 6b that is rotatably supported in the steering direction (about the kingpin axis P) by the suspension structure member and is pivotally supported in the vertical direction of the vehicle. The steering bracket 3c is formed with a rod connecting portion (see FIG. 2) at its tip, which is connected to a tip of a tie rod 5A extending from a rack and pinion 5 and operable by a steering wheel (not shown). Thus, when the driver rotates the steering wheel, the knuckle 3 rotates about the kingpin axis P that is positioned in a line connecting the kingpin rotating portion 6a and the lower arm supporting portion 6b to thereby steer the wheel. In other words, rotation of the steering wheel is converted into a linear stroke in the vehicle width or lateral direction by the rack and pinion 5. Thus, the tie rod 5A projects and retracts laterally. Further, when the tie rod 5A projects laterally outside (right side in FIG. 2), the forward end of the knuckle 3 is pushed laterally outside to steer the wheel 1 in the left direction. Conversely, when the tie rod 5A is retracted laterally inside (left side in FIG. 2), the forward end of the knuckle 3 is pulled laterally inside to steer the wheel 1 in the right direction.

Further, the wheel 1 is suspended on the vehicle body S via the suspension structure member 10 that positions the wheel 1 and the shock absorber for retracting and expanding along with vertical movement of the wheel 1 so as to be able to stroke in the vehicle vertical direction. Note that, in the first embodiment, the shock absorber 15 is a so-called coil over type in which the spring 16a and the damper 16b are integral and coaxially disposed. The shock absorber 15 is fixed to the vehicle body at its tip 15b.

Configuration of Suspension Structure Member

As shown in FIG. 1, the suspension structure member 10 includes an upper suspension arm 11 (suspension arm), a lower suspension arm 12, and a third link 13 (link member).

The upper suspension arm 11 is disposed in the vehicle upper position higher than the axle Q, which includes a front upper arm 11a disposed in the vehicle forward side of the shock absorber 15, a rear upper arm 11b disposed in the vehicle rearward side of the shock absorber 15, and a connecting upper arm 11c that connects the front upper arm 11a and the rear upper arm 11b. The front upper arm 11a and the rear upper arm 11b extend laterally respectively, and the vehicle body side ends 11d are supported with respect the vehicle body S pivotally in the vertical and longitudinal directions. The connecting upper arm 11c extends in the vehicle longitudinal direction and penetrates a wheel side end 11e of the front upper arm 11a, an arm connecting portion 13a of the third link 13 (described below), and a wheel-side end 11e of the rear upper arm 11b in this order from the vehicle front (see FIG. 2). In this situation, a bearing (not shown) is interposed between the connecting upper arm 11c and the front upper arm 11a, between the connecting upper arm 11c and the third link 13, and between the connecting upper arm 11c and rear upper arm 11b, respectively. Further, the with respect to the connecting upper arm 11c, the front upper arm 11a, the third link 13, and the rear upper arm 11b are connected swingably or pivotally in the vertical direction.

The lower suspension arm 12 is disposed in the vehicle bottom position lower than the axle Q, which is pivotally or swingably supported at the vehicle body side end 12a in the vertical and longitudinal directions relative to the vehicle body S. Further, the wheel side end 12b is connected to a lower arm supporting portion 6b of the lower bracket 3b that extends downwardly from the knuckle 3.

Configuration of Third Link

As shown in FIG. 1, the third link 13 operates as a link member to connect the wheel 1 and the upper suspension arm 11 while connecting the wheel 1 and the shock absorber 15. Further, as shown in FIG. 1, the third link 13 includes an arm connecting portion 13a, a wheel supporting portion 13b, and a shock absorber connecting portion 13c.

The arm connecting portion 13a is formed in the upper portion of the third link 13 and the connecting upper arm 11c of the upper suspension arm 11 is penetrated therethrough. At respective ends of the connecting upper arm 11c, the front upper arm 11a and the rear upper arm 11b are connected respectively. The upper suspension arm 11 will be in trapezoidal shape in plan view. Thus, the third link 13 is rotation-restricted with respect to the vehicle body S, and connected to the upper suspension arm 11 pivotal only in the vertical direction. Note that, in the first embodiment, the arm connecting portion 13a is disposed in the vehicle upper position higher than the tire 1a of the wheel 1 while protruding laterally outside to protrude upwardly of the tire 1a.

The wheel supporting portion 13b is formed in the intermediate portion of the third link 13 and is disposed in a position below the arm connecting portion 13a. A kingpin rotating portion 6a formed in an upper bracket 3a of the knuckle 3 is connected to the wheel supporting portion 13b rotatably about the kingpin axis P so as to support the wheel 1 about the kingpin axis P. Further, the wheel supporting portion 13b projects laterally outside and is disposed in a vehicle outside position than the shock absorber connecting portion 13c and intrudes in a wheel inside area R of the wheel 1 enclosed by the rim 1c and the wheel disc 1d (see FIG. 2).

The shock absorber connecting portion 13c is formed in the lower portion of the third link 13 and connected to the shock absorber 15 by inserting a bolt in a state of being sandwiched by a pair of attachment plates (not shown) formed in the lower end 15a of the shock absorber 15. In other words, the shock absorber connecting portion 13c is swivel or pivotally connected in the vertical direction with respect to the lower portion 15a of the shock absorber 15. Further, as shown in FIG. 1, the shock absorber connecting portion 13a is disposed below the upper end 8a (upper end portion) of the in-wheel motor unit 7.

Further, as shown in FIG. 2, in the first embodiment, in order to avoid conflict between the shock absorber 15 and the in-wheel motor unit 7, the shock absorber connecting portion 13c is disposed in the vehicle rearward direction with respect to the rear end surface 8b (rear end portion) of the in-wheel motor unit 7.

Here, "the upper end surface 8a" refers to an upper surface of the unit case 7a of the in-wheel motor unit 7, which faces the vehicle upward and represents the highest position of the vehicle among the various portions of the unit case 7a. Further, "the rear end surface 8b" refers to a rear surface of the unit case 7a of the in-wheel motor unit 7, which face the vehicle rearward and represents the most rearward position of the unit case 7a. Note that the unit case 7a is formed in a generally rectangular or box shape for accommodating an electric motor (rotating electrical machine) and a speed reduction unit (transmission).

Now, a description is given of the operation of the suspension device for an in-wheel motor driven wheel in the first embodiment in the "SUPPORTING OPERATION OF INPUT LOAD FROM WHEEL", "SHOCK ABSORBER LAYOUT", and "REACTION FORCE RECEIVING OPERATION OF THIRD LINK", separately.

Supporting Operation of Input Load from Wheel

In the suspension device of the first embodiment, the upper suspension arm 11 and the shock absorber 15 are connected to the wheel 1 via the third link. Further, the third link 13 is supported on the upper bracket 3a of the knuckle 3 at the wheel supporting portion 13b. In this situation, the wheel supporting portion 13b is point-supported on the kingpin rotating portion 6a so that the third link 13 and the knuckle 3 are relatively rotatable to each other about the kingpin axis P.

Thus, upon a vertical movement of the wheel 1, in response to the vertical movement, the entire third link moves upwardly and downwardly. In other words, the vertical load acting on the wheel 1 is input to the wheel supporting portion 13b of the third link 13 via the kingpin rotating portion 6a of the knuckle 3. Here, although the wheel supporting portion 13b is rotatable about the kingpin axis P, it is restricted in the vertical movement, due to the load in the vehicle vertical direction, which has been input from the wheel supporting portion 13b, the entire third link 13 is caused to move vertically.

Thus, irrespective of the setting positions of the arm connecting portion 13a and the shock absorber connecting portion 13c, it is possible to control the vertical load input from the wheel 1, a force acting on the upper suspension arm 11 from the third link 13, and a force acting on the shock absorber 15 from the third link to roughly the same magnitude.

Consequently, in order to secure a space for arranging the in-wheel motor unit 7 between the shock absorber 15 and the wheel 1, even when the lower end 15a of the shock absorber 15 is placed in the vicinity of the vehicle body S away from the wheel 1, the lever ratio may be set to approximately 1. Here, the "lever ratio" is a ratio of the vertical stroke of the coil spring 16a of the shock absorber 15 to the vertical stroke of the wheel 1. Thus, the lever ratio of the shock absorber 15 may be prevented from being worsened.

Shock Absorber Layout

In the suspension device of the first embodiment, as shown in FIG. 1, the shock absorber connecting portion 13c of the third link 13 is disposed in the vehicle bottom position lower than the upper end surface 8a of the in-wheel motor unit 7. In other words, the lower end 15a of the shock absorber 15 connected to the shock absorber connecting portion 13c overlaps with the in-wheel motor unit 7 in the vehicle vertical direction.

Thus, it is possible to set the lower end 15a of the shock absorber 15 at a relatively lower position (i.e. position near the road surface) while avoiding the conflict between the shock absorber 15 and the in-wheel motor unit 7. Therefore, without setting the upper position that corresponds to the vehicle mounting position of the shock absorber 15 at a high position, the overall length of the shock absorber 15 may be set at an appropriate length that ensures a necessary stroke.

Furthermore, in the suspension device of the first embodiment, since there is no need to set the upper end 15b of the shock absorber 15 to the high position, a strut housing formed in the vehicle body S (not shown) would not protrude upwardly. Therefore, it is not necessary to increase the height of the hood (not shown) covering the strut housing.

Note that, in a suspension device of general double wishbone type, the mounting freedom of the shock absorber 15 is extremely limited. In addition, in order to secure a motor mounting space while avoiding conflict with the in-wheel motor unit 7, a need arises to greatly worsen the lever ratio of the shock absorber 15 or to set the lower end 15a of the shock absorber 15 at a relatively high position.

In contrast, in the suspension device in the first embodiment, by interposing the third link 13 between the wheel 1 and the upper suspension arm 11/shock absorber 15, it is possible to allow roughly the same magnitude of the input load from the wheel 1 to be input to the shock absorber 15. Therefore, without setting the upper position of the shock absorber 15 to a high position, it is possible to ensure a sufficient lever ratio and stroke.

Reaction Force Receiving Operation of Third Link

Figure 3:
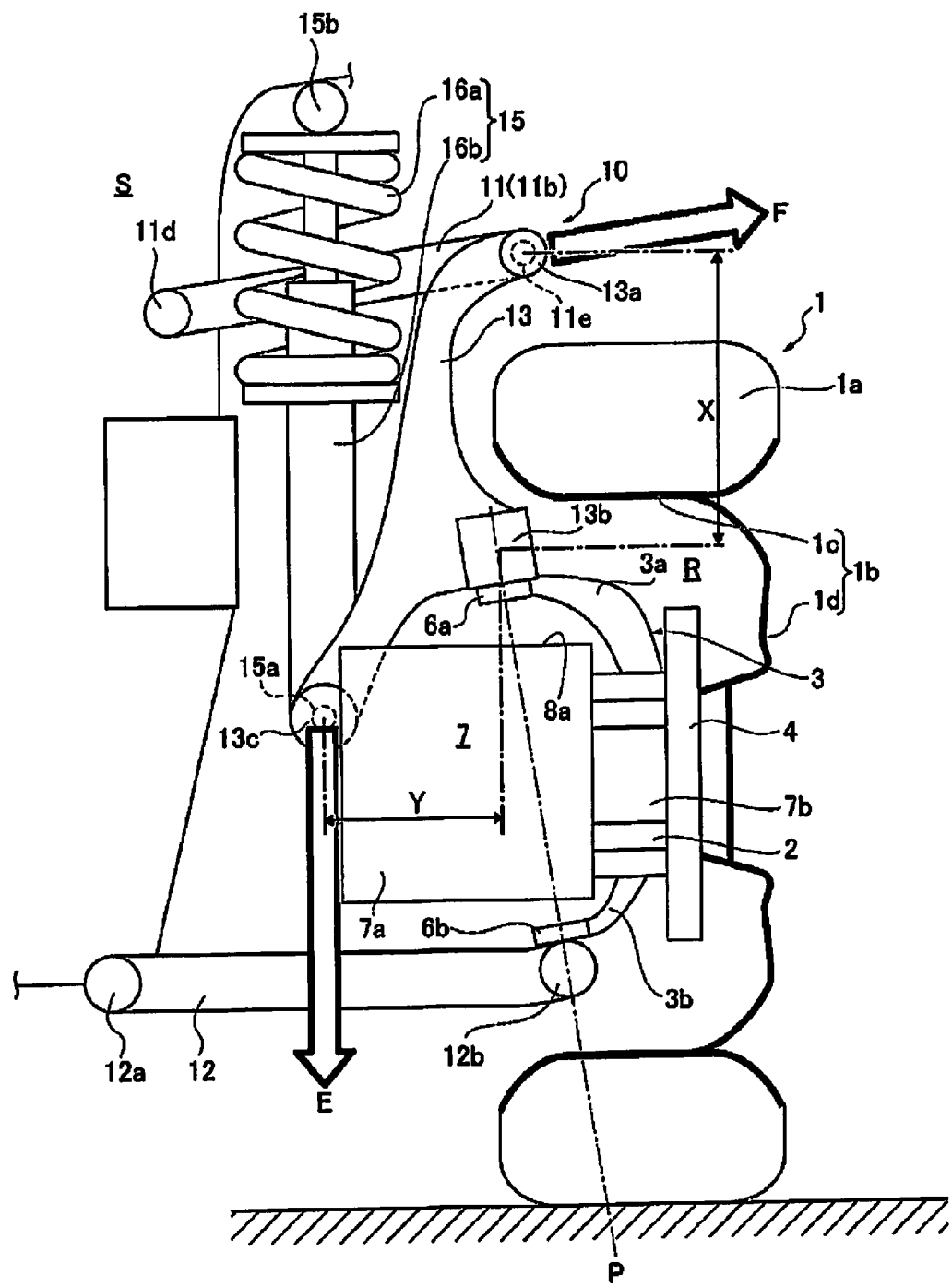
FIG. 3 is an explanatory view showing a reaction force applied to the third link in a suspension device of the first embodiment.
Figure 4:
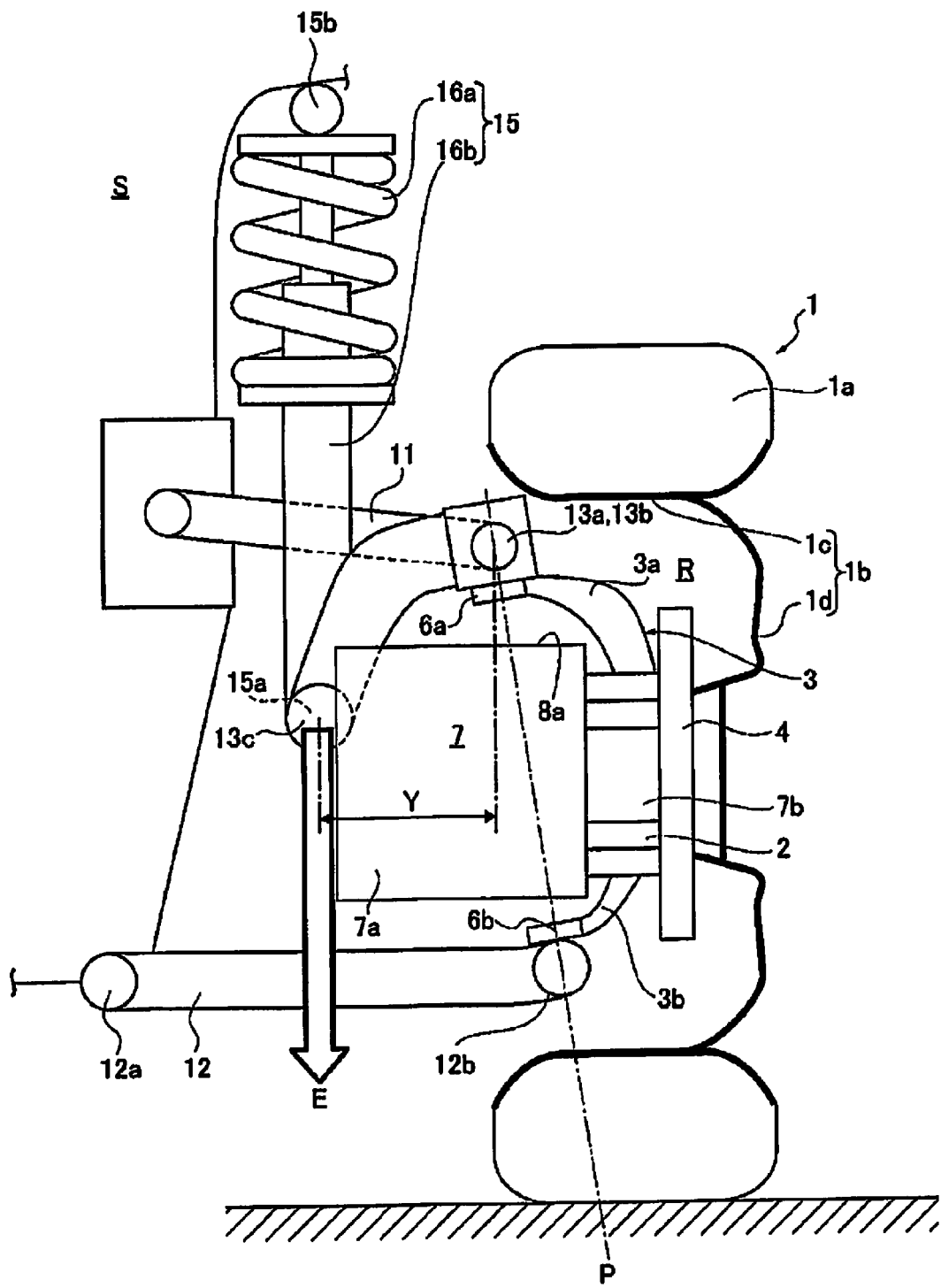
FIG. 4 is an explanatory view showing a reaction force applied to the third link in a suspension device of Comparative Example.

FIG. 3 is an explanatory view showing a reaction force applied to the third link in a suspension device of the first embodiment. FIG. 4 is an explanatory view showing a reaction force applied to the third link in a suspension device of Comparative Example. Below, with reference to FIGS. 3, 4, a description is made of the reaction force receiving operation of the third link.

In the suspension device in the first embodiment, the wheel supporting portion 13b of the third link 13 is disposed in a lateral outside position of the shock absorber connecting portion 13c and in the vehicle bottom position lower than the arm connecting portion 13a. In other words, as shown in FIG. 3, a distance X is secured in the vehicle vertical direction between the wheel supporting portion 13b and the arm connecting portion 13a while securing a distance Y in the lateral direction between the wheel supporting portion 13b and the shock absorber connecting portion 13c.

On the other hand, in response to the vertical movement of the wheel 1, a reaction force F is applied at the arm connecting portion 13a as shown by an arrow in FIG. 3. Further, a reaction force E is applied at the shock absorber connecting portion 13c. Here, the reaction force F is applied laterally outside of the vehicle whereas the reaction force E is exerted in the vehicle downward direction. Thus, the reaction forces F and E are applied to cancel each other about the center of the wheel supporting portion 13b that rotates about the kingpin axis P.

Thus, it is possible to reduce the bending moment about the kingpin axis P applied to the wheel supporting portion 13b to thereby make the size of the kingpin rotating portion 6a formed in the knuckle 3 small. Consequently, a peripheral space of the in-wheel motor unit 7 may be expanded so as to secure a large space available for accommodating the in-wheel motor unit 7.

Note that, as shown in FIG. 4, an example is assumed in which the position of the upper suspension arm 11 is set in a position lower than the first embodiment and the height of the arm connecting portion 13a of the third link is set at roughly the same height as the wheel supporting portion 13b. In this example, it is not possible to secure the distance X in the vertical direction between the wheel supporting portion 13b and the arm connecting portion 13a. Thus, as shown in FIG. 4, despite the vertical movement of the wheel 1, no reaction force is applied to the arm connecting portion 13a of the third link. Only the reaction force E is applied at the shock absorber connecting portion 13c, which is directed in the downward direction of the vehicle. Thus, due to inability to cancel the reaction force E, the bending moment applied to the wheel supporting portion 13b about the kingpin axis P will be excessive. Therefore, since the load exerted on the kingpin rotating portion 6a formed in the knuckle 3 becomes large, the kingpin rotating portion 6a is required to be formed in a large size. Consequently, a problem arises that the space available for arranging the in-wheel motor unit 7 will be decreased.

Now, a description is given of effects. In the suspension device for an in-wheel motor driven wheel in the first embodiment, it is possible to achieve the effects listed below.

(1) A suspension device for an in-wheel motor driven wheel in which a wheel 1 driven by an in-wheel motor unit 7 is suspended on a vehicle body S via a suspension structure member 10 and a shock absorber 15, wherein the suspension structure member 10 comprises a suspension arm (upper suspension arm 11) that is pivotally supported with respect to the vehicle body S, and a link member (third link 13) that pivotally connects the wheel 1 to the suspension arm (upper suspension arm 11) while having a shock absorber connecting portion 13c connected to the lower end 15a of the shock absorber 15, wherein the shock absorber connecting portion 13c is disposed in the vehicle bottom position lower than an upper end (upper end surface 8a) of the in-wheel motor unit 7.

Thus, it is possible to secure a sufficient lever ratio and stroke of the shock absorber 15 without relying on elevating the upper end 15b of the shock absorber 15.

(2) The suspension arm includes an upper suspension arm 11 that is disposed in the vehicle upper position higher than the axle Q of the wheel 1 for pivotally supporting the wheel 1 at the vehicle upper position higher than the axle Q, wherein the link member (third link 13) comprises an arm connecting portion 12a that connects the suspension arm (upper suspension arm 11) vertically pivotally and a wheel supporting portion 13b for pivotally supporting the wheel 1 in the steering direction, and wherein the wheel supporting portion 13b is configured to be disposed in a lateral outside position of the shock absorber connecting portion 13c and in a vehicle bottom position lower than the arm connecting portion 13a. Thus, it is possible to decrease the bending moment acting on the wheel supporting portion 13b to thereby expand an accommodating space for the in-wheel motor unit 7.

Second Embodiment

In a second embodiment, the arrangement of the wheel supporting portion of the third link and the shock absorber connecting portion is configured differently from the first embodiment.

Figure 5:
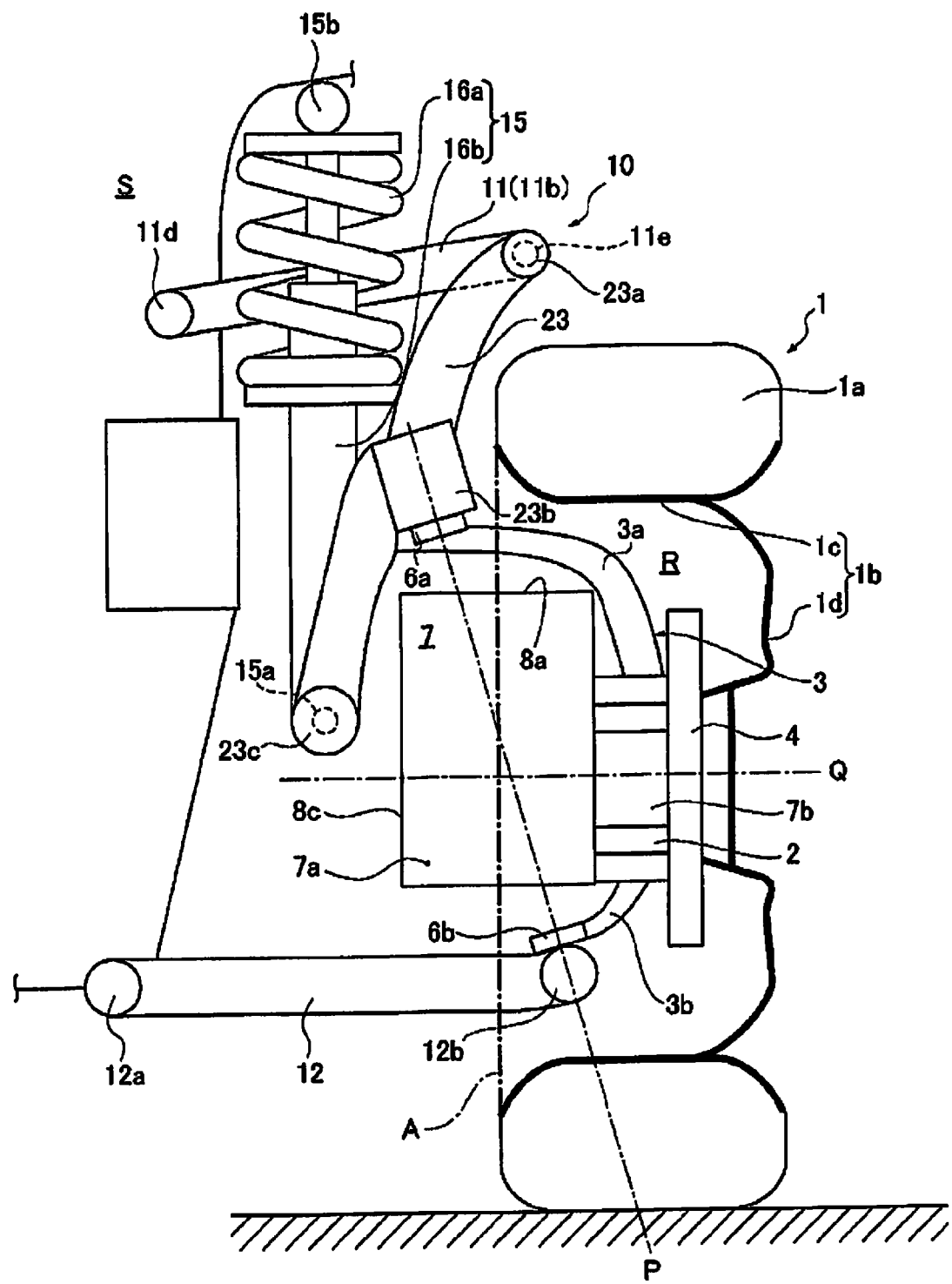
FIG. 5 is a front view of an in-wheel motor driven wheel, when viewed from the front of the vehicle, to which a suspension device of a second embodiment is applied.
Figure 6:
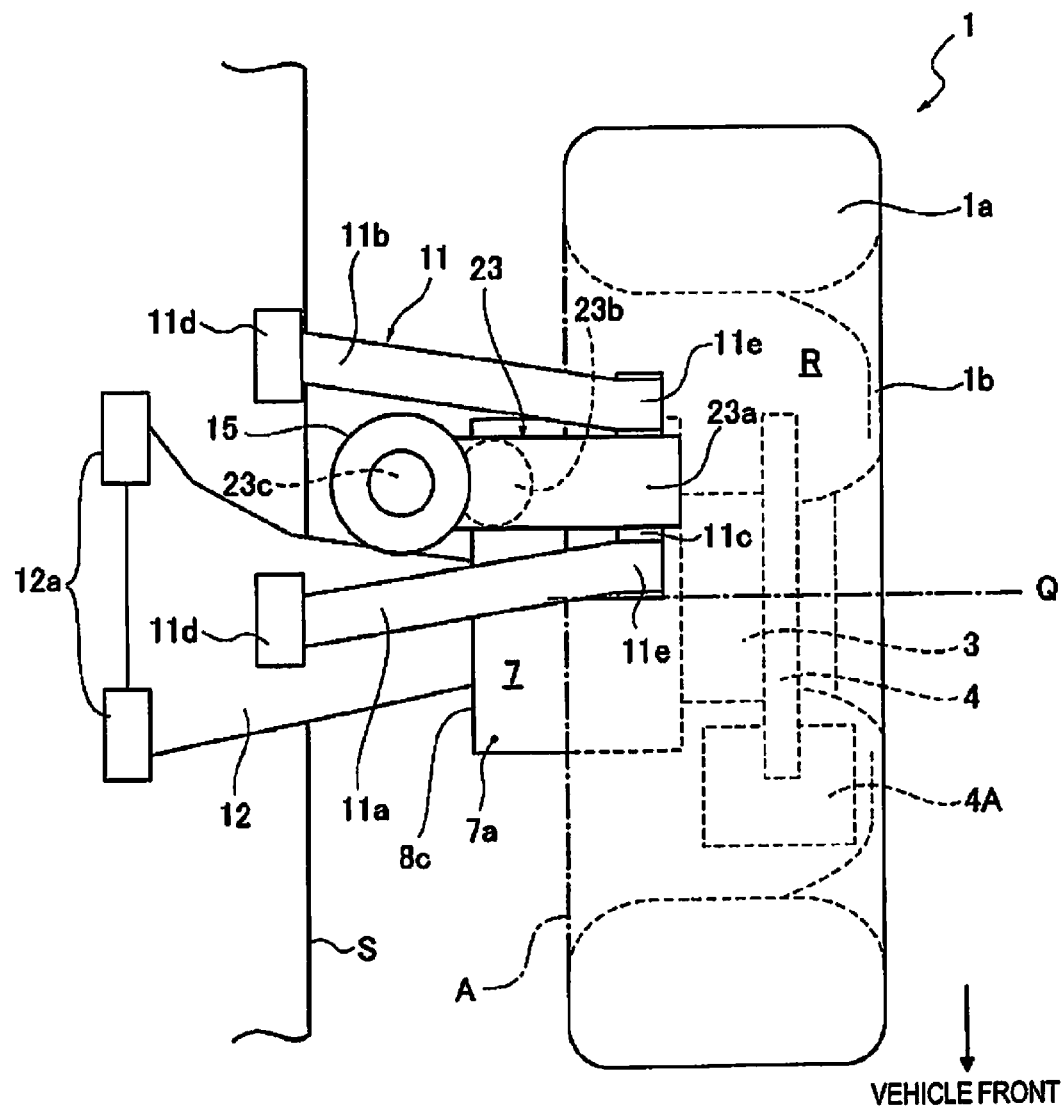
FIG. 6 is a plan view of an in-wheel motor driven wheel, when viewed from the top of the vehicle, to which a suspension device of the second embodiment is applied.

FIG. 5 is a front view of an in-wheel motor driven wheel, when viewed from the front of the vehicle, to which a suspension device of a second embodiment is applied. FIG. 6 is a plan view of an in-wheel motor driven wheel, when viewed from the top of the vehicle, to which a suspension device of the second embodiment is applied. Note that the same structure as in the first embodiment is attached with the same reference numeral, and a detailed description thereof will be omitted.

In the suspension device in the second embodiment, similar to the first embodiment, the wheel 1 is connected to the upper suspension arm 11 and the shock absorber 15 via the third link 23 (link member). Further, the third link 23 has an arm connecting portion 23a, a wheel supporting portion 23b, and a shock absorber connecting portion 23c.

In addition, as shown in FIG. 5, the wheel supporting portion 23b is arranged outside of a wheel inner side area R of the wheel 1, which is enclosed by the rim 1c and the wheel disc 1d, and is disposed in a space between a vehicle body-side open surface of the wheel disc 1d (shown by a dotted line A in FIG. 5) and the vehicle body S. In other words, the wheel supporting portion 23b of the second embodiment is disposed in a position away from the wheel inner side area R.

Moreover, as shown in FIG. 5, the shock absorber connecting portion 23c is disposed in the vehicle bottom position lower than the upper end surface 8a (upper end portion)

of the in-wheel motor unit 7, and, as shown in FIG. 6, in a lateral inside position than the vehicle body-side end surface 8c (vehicle body-side end portion) of the in-wheel moto unit 7. In other words, the shock absorber connecting portion 23c is disposed between the vehicle body S and the vehicle body-side end surface 8c of the in-wheel motor unit 7. Here, "the vehicle body-side end surface 8c" refers to a side surface of the unit case 7a of the in-wheel motor unit 7, which faces the vehicle body S and that presents the closest portion of the unit case 7a to the vehicle body S.

Further, by placing the wheel supporting portion 23b in a position away from the wheel inner side area R, it is possible to place the wheel supporting portion 23b connected to the upper bracket 3a of the knuckle 3 outside of the wheel inner side area R for accommodating the in-wheel motor unit 7. Therefore, it is possible to expand the accommodating area available for the in-wheel motor unit 7 to thereby increase the size of the motor.

In the second embodiment, in particular, since the wheel supporting portion 23b is disposed in a position higher than the axle Q, the motor size may be expanded radially upwardly from the axle Q.

Further, by placing the shock absorber connecting portion 23c in a position between the vehicle body S and the vehicle body-side end surface 8c of the in-wheel motor unit 7, it is possible to position the shock absorber connecting portion 23c free from interfering of the in-wheel motor unit 7 due to whirling, which is generated about the axle Q (radially) during a driving operation.

In contrast, by placing the shock absorber connecting portion 23c between the vehicle body S and the vehicle body-side end surface 8c, the shock absorber connecting portion 23c is positioned in the side of the in-wheel motor unit 7 in the axial direction. Thus, it is possible to prevent the interference between the shock absorber connecting portion 23c and the in-wheel motor unit 7 due to the centrifugal whirling of the in-wheel motor unit 7.

Now, a description is given of effects. In the suspension device for an in-wheel motor driven wheel in the second embodiment, it is possible to achieve the effects listed below.

(3) The wheel 1 includes a rim 1c to support the tire 1a and a wheel disc 1d connected to the in-wheel motor unit 7, and the link member (third link 23) includes a wheel supporting portion 23b for pivotally supporting the wheel 1 in a steering direction, wherein the wheel supporting portion 23b is configured to be disposed in a position away from the wheel inner side area R enclosed by the rim 1c and the wheel disc 1d. Thus, the wheel supporting portion 23b may be placed outside of the wheel inner side area R in which the in-wheel motor unit 7 is disposed to thereby increase the motor size.

(4) The shock absorber connecting portion 23c is configured to be disposed in a position between the vehicle body S and the vehicle body-side end portion (vehicle body side-end surface 8c) of the in-wheel moto unit 7. Thus, the shock absorber connecting portion 23c may be placed in a position free from interference due to whirling of the in-wheel motor unit 7 to thereby increase the motor size in the radial direction, Third Embodiment In a third embodiment, the configuration of the in-wheel motor unit and the layout of the wheel supporting portion and the shock absorber connecting portion are different from the first and second embodiments.

Figure 7:
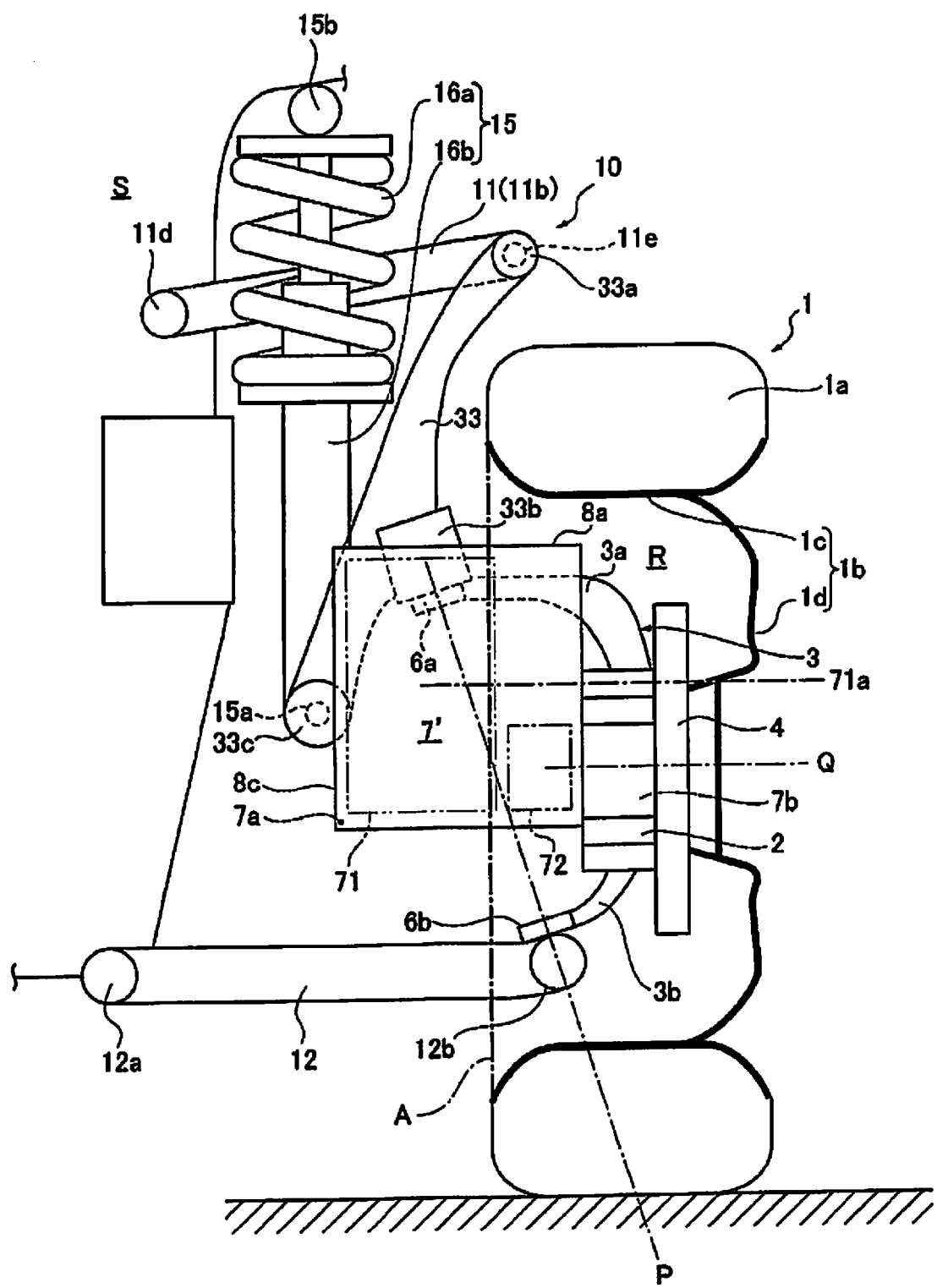
FIG. 7 is a front view of an in-wheel motor driven wheel, when viewed from the front of the vehicle, to which a suspension device of a third embodiment is applied.
Figure 8:
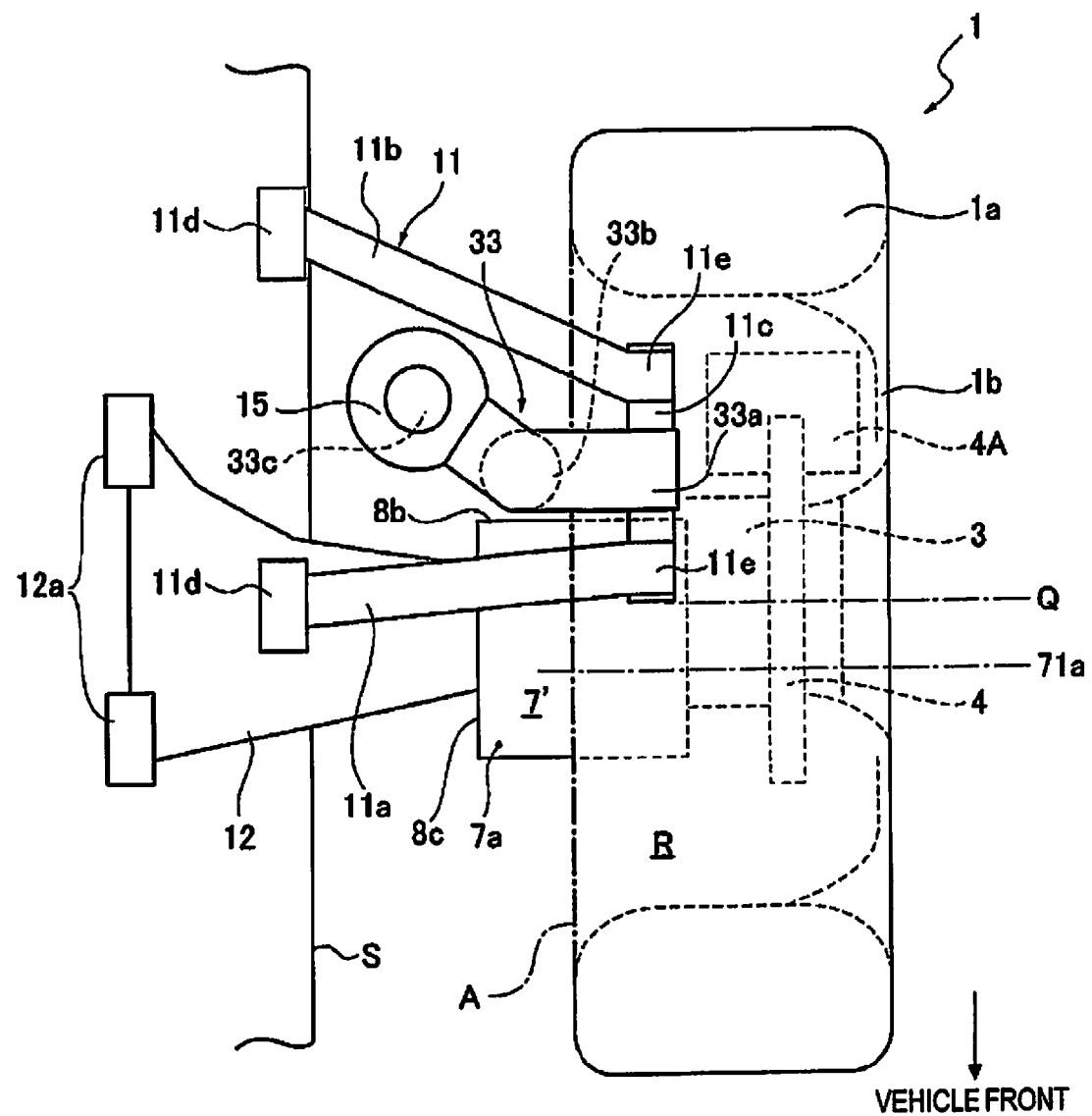
FIG. 8 is a plan view of an in-wheel motor driven wheel, when viewed from the top of the vehicle, to which a suspension device of the third embodiment is applied.

FIG. 7 is a front view of an in-wheel motor driven wheel, when viewed from the front of the vehicle, to which a suspension device of a third embodiment is applied. FIG. 8 is a plan view of an in-wheel motor driven wheel, when viewed from the top of the vehicle, to which a suspension device of the third embodiment is applied. Note that the same structure as in the first and second embodiments, the same reference numeral is attached and detailed description thereof will be omitted.

In the suspension device in the third embodiment, as shown in FIG. 7, the in-wheel motor unit 7' has an electric motor 71 (rotating electrical machine) and a speed reduction gear 72 (transmission) accommodated in a unit case 7a. Further, a motor output shaft 71a of the electric motor 71 is offset with respect the output shaft 7b of the in-wheel motor unit 7' which represents an output shaft of the speed reduction gear. Here, since the output shaft 7b of the in-wheel motor unit 7' is coaxially arranged with the axle Q of the wheel 1, the motor output shaft 71a of the electric motor 71 is in a state offset from the axle Q of the wheel 1. Note that, as shown in FIGS. 7, 8, the motor output shaft 71a is offset in the vehicle vertical direction as well as in the vehicle longitudinal direction with respect to the axle Q such that the motor output shaft 71a is positioned upwardly of the axle Q, and forwardly of the axle Q.

Further, in the suspension device in the third embodiment as well, similar to the first and second embodiments, the wheel 1 is connected to the upper suspension arm 11 and the shock absorber 15 through the third link 33 (link member). Further, the third link includes an arm connecting portion 33a, a wheel supporting portion 33b, and a shock absorber connecting portion 33c.

In addition, as shown in FIG. 8, the wheel supporting portion 33b is disposed outside of the wheel inner side area R of the wheel enclosed by the rim 1c and the wheel disc 1d, i.e., in the side of the vehicle body S, and further disposed in the vehicle forward position with respect to the shock absorber connecting portion 33c in the lateral outer side of the vehicle. Also, in the present embodiment, the wheel supporting portion 33b is disposed in the vehicle rearward position of the rear end surface 8b (rear end portion) of the in-wheel motor unit 7'. More specifically, the wheel supporting portion 33b is disposed, in the longitudinal direction, between the rear end surface 8b of the in-wheel motor unit 7' and the shock absorber connecting portion 33c. Further, the wheel supporting portion 33b is disposed, in the lateral direction, in a position between the vehicle body-side open surface (shown by dotted line A in FIG. 8) of the wheel disc 1d and the shock absorber connecting portion 33c.

Further, as shown in FIG. 8, the wheel supporting portion 33b is disposed in the vehicle rearward position than the motor output shaft 71a of the electric motor 71 accommodated in the unit case 7a. In other words, when viewed in a direction from the vehicle forward toward the vehicle rearward, the motor output shaft 71a of the electric motor 71, the wheel supporting portion 33b, and the shock absorber connecting portion 33c are arranged in this order.

Also, as shown in FIG. 7, the shock absorber connecting portion 33c is disposed in the vehicle bottom position lower than the upper end surface 8a (end portion) of the in-wheel motor unit 7' and, as shown in FIG. 8, is disposed in the vehicle rearward position of the rear end surface 8b of the in-wheel motor unit 7'. Note that "in the vehicle rearward position of the rear end surface 8b" is intended to the arrangement in which the shock absorber connecting portion 33 would be placed in the vehicle rearward position despite the whirling state of the in-wheel moto unit 7' along with steering operation of the wheel 1.

By placing the shock absorber connecting portion 33c in the vehicle rearward position of the rear end surface 8b of the in-wheel motor unit 7', even when the in-wheel motor unit 7' undergoes a centrifugal whirling, interference with the shock absorber connecting portion 33c ma be prevented.

In other words, when the wheel 1 is steered, the in-wheel motor unit 7' undergoes whirling integrally with the wheel 1 which rotates about a kingpin axis P connecting the kingpin rotating portion 6a and the lower arm supporting portion 6b of the knuckle 3. That is, the in-wheel motor unit 7' rotates about an axis (kingpin axis P) that passes through the wheel supporting portion 33b. In this situation, since the shock absorber connecting portion 33c is placed so as to assume a vehicle rearward position than the rear end surface 8b, even when the shock absorber connecting portion 33c is placed in the vehicle bottom position lower than the upper end surface 8a of the in-wheel motor unit 7', no conflict with the unit case 7a occurs due to whirling of the in-wheel motor unit 7' about the wheel supporting portion 33b.

Thus, it is possible to arrange the shock absorber connecting portion 33c in a low position without given consideration of the possible conflict in the axle direction Q with the in-wheel motor unit 7'. Consequently, without setting the upper end 15b of the shock absorber 15 to a high position, it is possible to expand the motor size of the in-wheel motor unit 7'.

Further, in the third embodiment, the motor output shaft 71a of the electric motor 71 of the in-wheel motor unit 7' is offset with respect to the axle Q. Further, the wheel supporting portion 33b is positioned in the vehicle forward position than the shock absorber connecting portion 33c, in the lateral outer side, and in the vehicle rearward position of the motor output shaft 71a of the electric motor 71. Thus, it is possible to secure an appropriate distance in a region of relatively severe interface condition, i.e., between the in-wheel motor unit 7' and the shock absorber 15.

In other words, in order to satisfy the steering stability requirements in the suspension device (requirements for performing vehicle steering according to the driver's intension and for ensuring a stable travelling performance against disturbance, hereinafter also referred to as "steering requirement"), the upper side of the kingpin axis P is normally inclined in the vehicle rearward so as to ensure an appropriate caster angle (tilted angle of the kingpin axis P in the vehicle longitudinal direction). Also, in order to ensure an appropriate kingpin inclination angle (inclination angle of the kingpin axis P in the lateral direction), the upper side of the kingpin axis P is generally inclined inwardly in the lateral direction. When considering the interference between the in-wheel motor unit 7' and the shock absorber 15 and layout of these components, the wheel supporting portion 33b may be placed in the vehicle rearward position with respect to the shock absorber connecting portion 33c. However, in that case, it is difficult to secure an appropriate inclination angle of the kingpin axis P, which would satisfy the steering requirements described above.

In other words, by providing the configuration of the third embodiment, while ensuring an appropriate geometry of the kingpin axis P from the steering stability perspective, it is possible to prevent the interference with the shock absorber connecting portion even when the in-wheel motor unit 7' undergoes whirling during steering operation of the wheel 1 to thereby expand the motor whirling space. Consequently, the motor size of the in-wheel motor unit 7' may be increased in a radial direction.

Now, a description is given of the effect. In the suspension device for an in-wheel motor driven wheel in the third embodiment, it is possible to achieve the effects listed below.

(5) The shock absorber connecting portion 33c is configured to be disposed in the vehicle rearward position of the rear end portion (rear end surface 8b) of the in-wheel motor unit 7'. Thus, without giving consideration to the interference of the in-wheel motor unit 7' in the axle Q direction, the shock absorber connecting portion 33c may be disposed in a low position so that the motor size or volume of the in-wheel motor unit 7' may be expanded in the axle direction.

(6) The in-wheel motor unit 7' includes a rotating electrical machine (electric motor 71), wherein the output shaft (motor output shaft 71a) of the rotating machine (electric motor 71) is offset with respect to the axle Q of the wheel 1, and the link member (third link 33) includes a wheel supporting portion 33b for pivotally supporting the wheel 1 in the steering direction, wherein the wheel supporting portion 33b is disposed in the vehicle forward position of the shock absorber connecting portion 33c, in the lateral outside position, and in the vehicle rearward position of the output shaft (motor output shaft 71a) of the rotating machine (electric motor 71). Thus, while ensuring an appropriate geometry of the kingpin axis P from the steering stability perspective, it is possible to expand the motor whirling space to thereby increase the motor size of the in-wheel motor unit 7' in a radial direction.

Fourth Embodiment

In a fourth embodiment, the wheel supporting portion and the arrangement of the shock absorber connecting portion are configured differently from the first to third embodiments.

Figure 9:
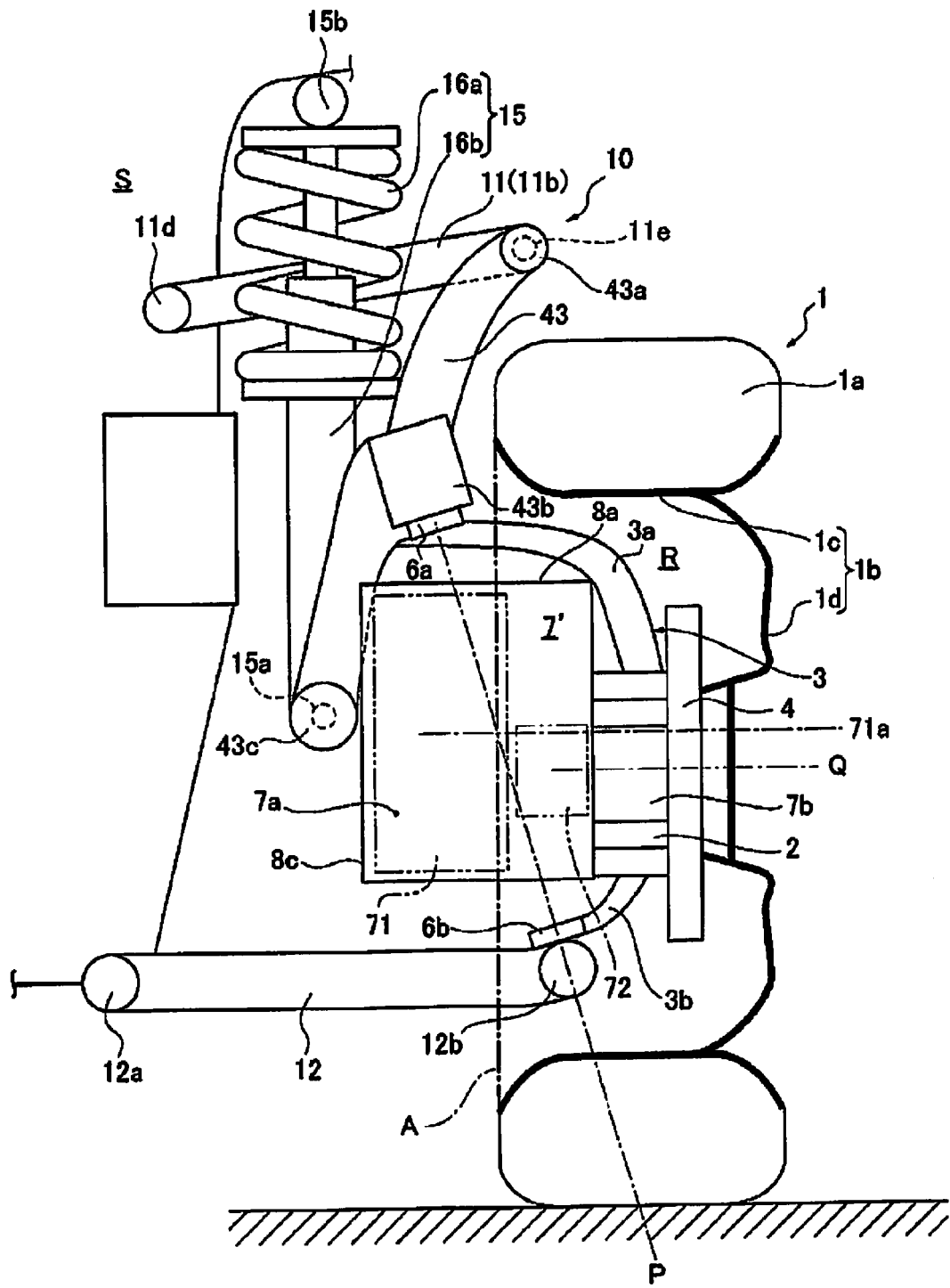
FIG. 9 is a front view of an in-wheel motor driven wheel, when viewed from the front of the vehicle, to which a suspension device of a fourth embodiment is applied.
Figure 10:
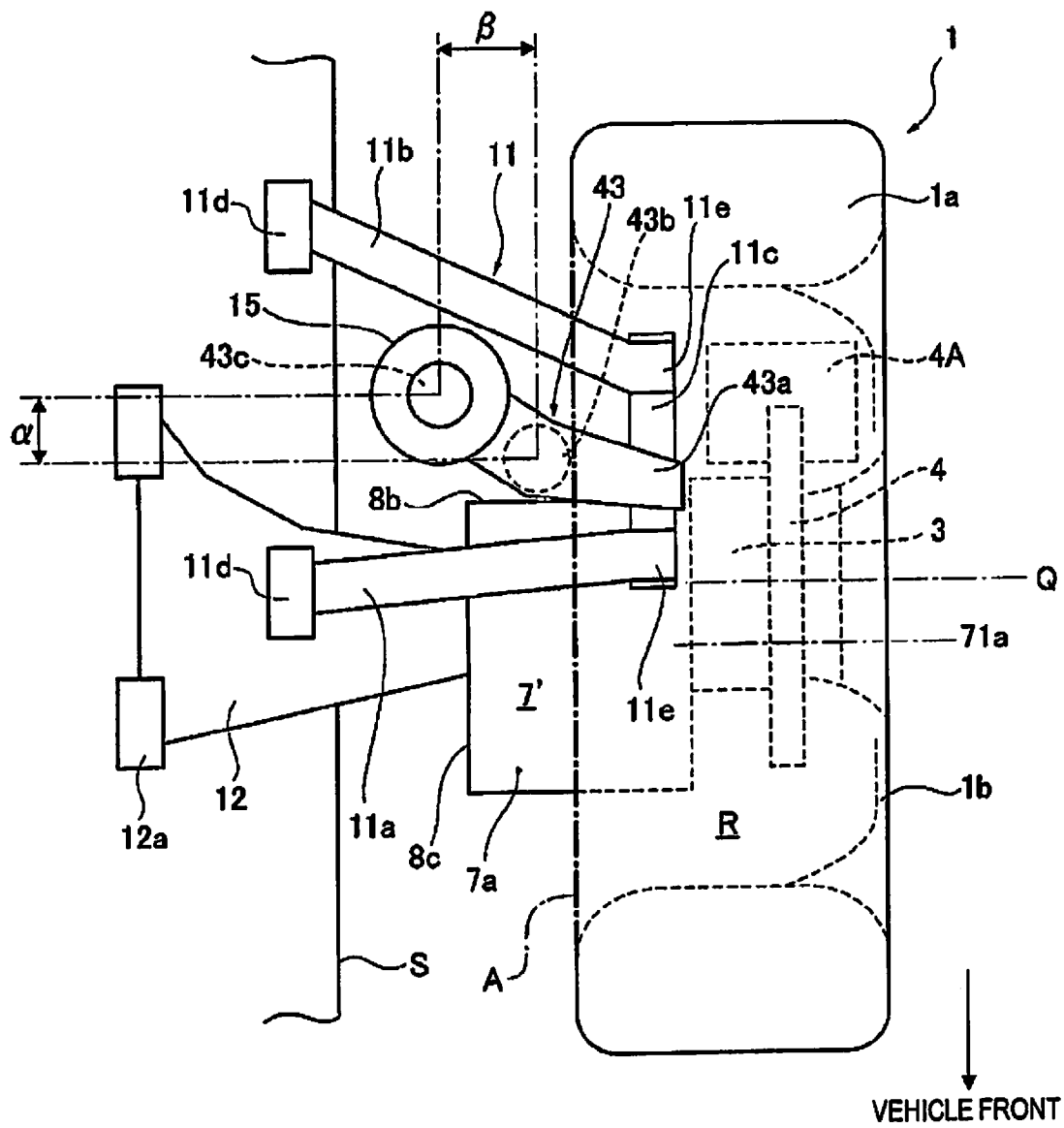
FIG. 10 is a plan view of an in-wheel motor driven wheel, when viewed from the top of the vehicle, to which a suspension device of the fourth embodiment is applied.

FIG. 9 is a front view of an in-wheel motor driven wheel, when viewed from the front of the vehicle, to which a suspension device of a fourth embodiment is applied. FIG. 10 is a plan view of an in-wheel motor driven wheel, when viewed from the top of the vehicle, to which a suspension device of the fourth embodiment is applied. Note that the configuration similar to the first embodiment is attached with the same reference numeral and detailed explanation thereof will be omitted.

In the suspension device of the fourth embodiment, in the same manner as in the third embodiment, the in-wheel motor unit 7' accommodates an electric motor 71 (rotating machine) and a speed reduction gear 72 within the unit case 7a. Further, the motor output shaft 71a of the electric motor 71 is offset with respect to the output shaft 7b of the in-wheel motor unit 7'.

Further, in the suspension device in the fourth embodiment, similar to the first to third embodiments, the wheel 1 is connected to the upper suspension arm 11 and the shock absorber 15 via the third link (link member). In addition, the third link 43 includes an arm connecting portion 43a, a wheel supporting portion 43b, and a shock absorber connecting portion 43c.

Further, as shown in FIGS. 9, 10, the wheel supporting portion 43b is disposed outside of the wheel inner side area R of the wheel 1 enclosed by the rim 1c and the wheel disc 1d. Further the wheel supporting portion 43b is disposed in the vehicle forward position of the shock absorber connecting portion 43c and in the lateral outside position. Furthermore, the wheel supporting portion 43b is arranged in the vehicle rearward position of the motor output shaft 71a of the electric motor 71.

Further, as shown in FIG. 10, in the fourth embodiment, the longitudinal dimension or size α between the shock absorber connecting portion 43c and the wheel supporting portion 43b is set to be smaller than the lateral dimension or size β between the shock absorber connecting portion 43c and the wheel supporting portion 43b. That is, the longitudinal dimension α between the shock absorber connecting portion 43c and the wheel supporting portion 43b is shorter than the lateral dimension β (left and right direction dimension).

Figure 11:
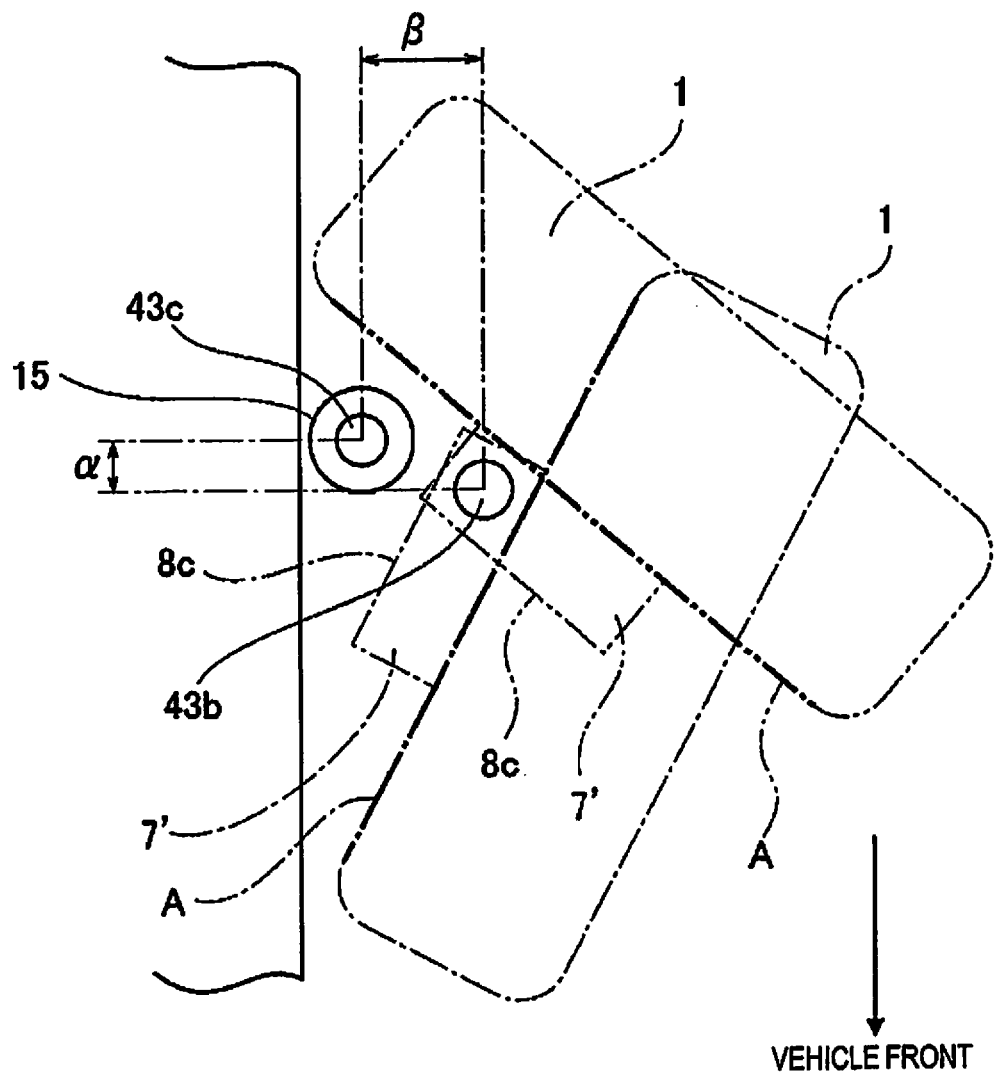
FIG. 11 is an explanatory view showing the positional relationship among the shock absorber, the in-wheel motor unit, and the wheel when the in-wheel motor driven wheel is steered to which a suspension device in the fourth embodiment is applied.

Here, as shown in FIG. 11 by a dashed line, the longitudinal dimension α between the shock absorber connecting portion 43c and the wheel supporting portion 43b is determined by an interference condition between the vehicle body-side end surface 8c and the shock absorber 15 when the wheel travels as an outer wheel during turn. In other words, the longitudinal dimension α is set to a minimum dimension at which the vehicle body-side end surface 8c approaches nearest to the shock absorber 15 in a non-conflict condition during turn of the wheel 1 as outer wheel.

Further, as shown in FIG. 11 by two dashed line, the lateral dimension β between the shock absorber connecting portion 43c and the wheel supporting portion 43b is determined by an interference condition between the vehicle body-side open face (shown in FIG. 11 by A) and the shock absorber 15 when the wheel 1 travels as an inner wheel during turn. In other words, the lateral dimension β is set to a minimum dimension at which the vehicle body-side open face A approaches nearest to the shock absorber 15 in a non-conflict condition during turn of the wheel 1 as inner wheel.

During turn of wheel, the turning radius of an outer wheel is greater than the turning radius of an inner wheel. Thus, generally, the turning amount of the inner wheel (steering angle of the inner wheel) is set greater than the turning amount of the outer wheel (steering angle of the outer wheel) so that the Ackermann ratio (representing the difference in steering angles between the inner wheel and the outer wheel) is equal to or greater than "zero". Further, in view of the steering resilience (restoring force of steering wheel) and side force distribution between the inner and outer wheels at turning limit, it is preferable to set the turning amount of the inner wheel moderately greater than that of the outer wheel.

As described, generally, the turning amount of the inner wheel is set to be greater than the turning amount of the outer wheel. This makes the interference condition between the vehicle body-side open face A of the wheel 1 and the shock absorber 15 during turn as inner wheel more severe as compared to the interference condition between the vehicle body-side end surface 8c and the shock absorber 15 during turn as the outer wheel. In the fourth embodiment, by setting the vehicle longitudinal dimension α between the shock absorber connecting portion 43c and the wheel supporting portion 43b shorter than the lateral dimension β (left and right direction dimension), it is possible to secure a maximum space available for whirling of the in-wheel motor unit 7' while avoiding the interference between the turning wheel 1 and the shock absorber 15. Thus, it is possible to increase the motor volume of the in-wheel motor unit 7' in the radial direction.

Now, a description is given of the effect. In the suspension device for an in-wheel motor driven wheel in the fourth embodiment, it is possible to achieve the effect below.

(7) The vehicle longitudinal dimension α between the shock absorber connecting portion 43c and the wheel supporting portion 43b is configured to be shorter than the lateral dimension β between the shock absorber connecting portion 43c and the wheel supporting portion 43b. Thus, it is possible to secure a maximum space available for whirling of the in-wheel motor unit 7' while avoiding the interference between the turning wheel 1 and the shock absorber 15.

Fifth Embodiment

In a fifth embodiment, the arrangement of kingpin axis is configured differently from the first to fourth embodiments.

Figure 12:
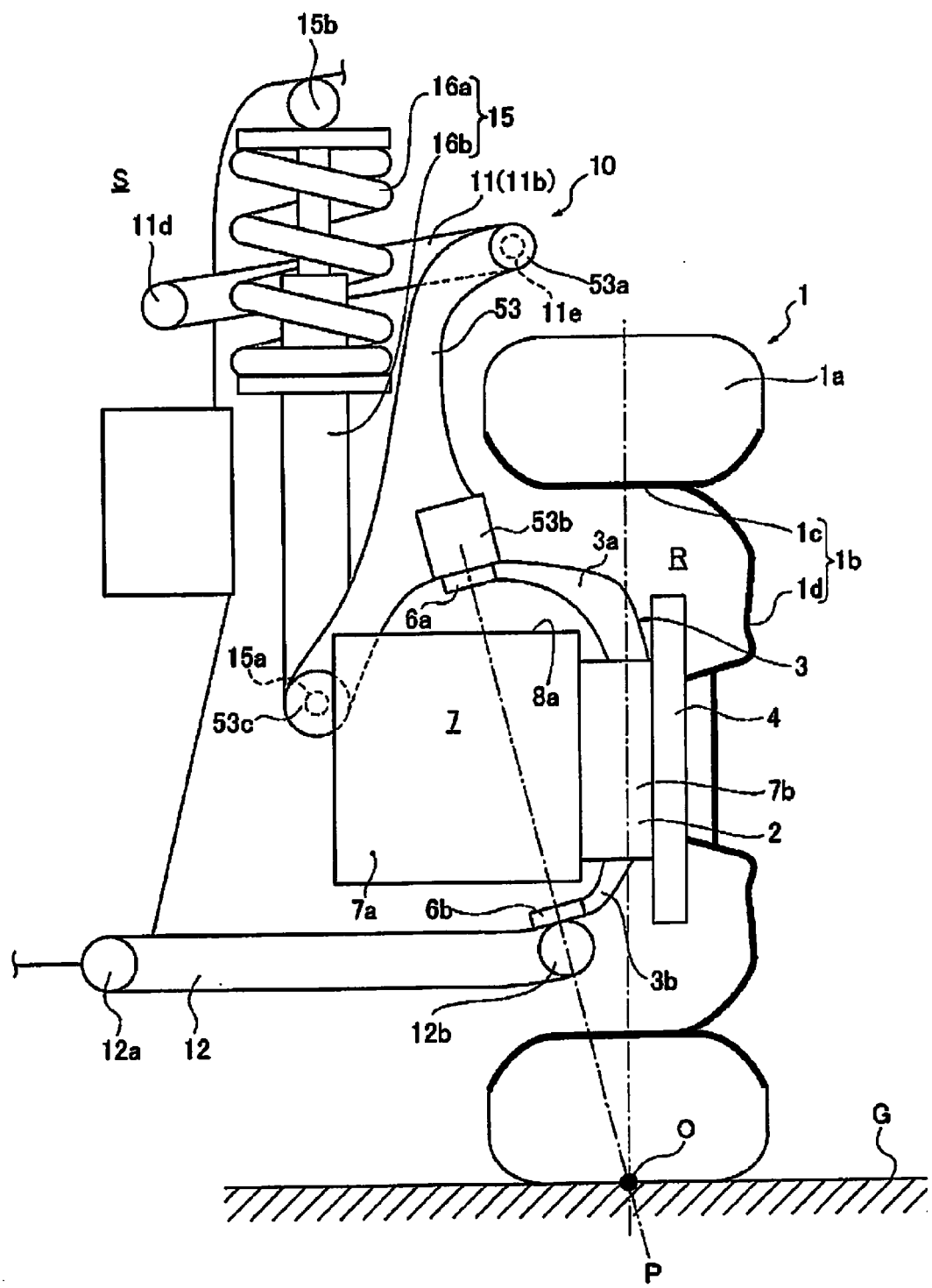
FIG. 12 is a front view of an in-wheel motor driven wheel, when viewed from the front of the vehicle, to which a suspension device of a fifth embodiment is applied.
Figure 13A:
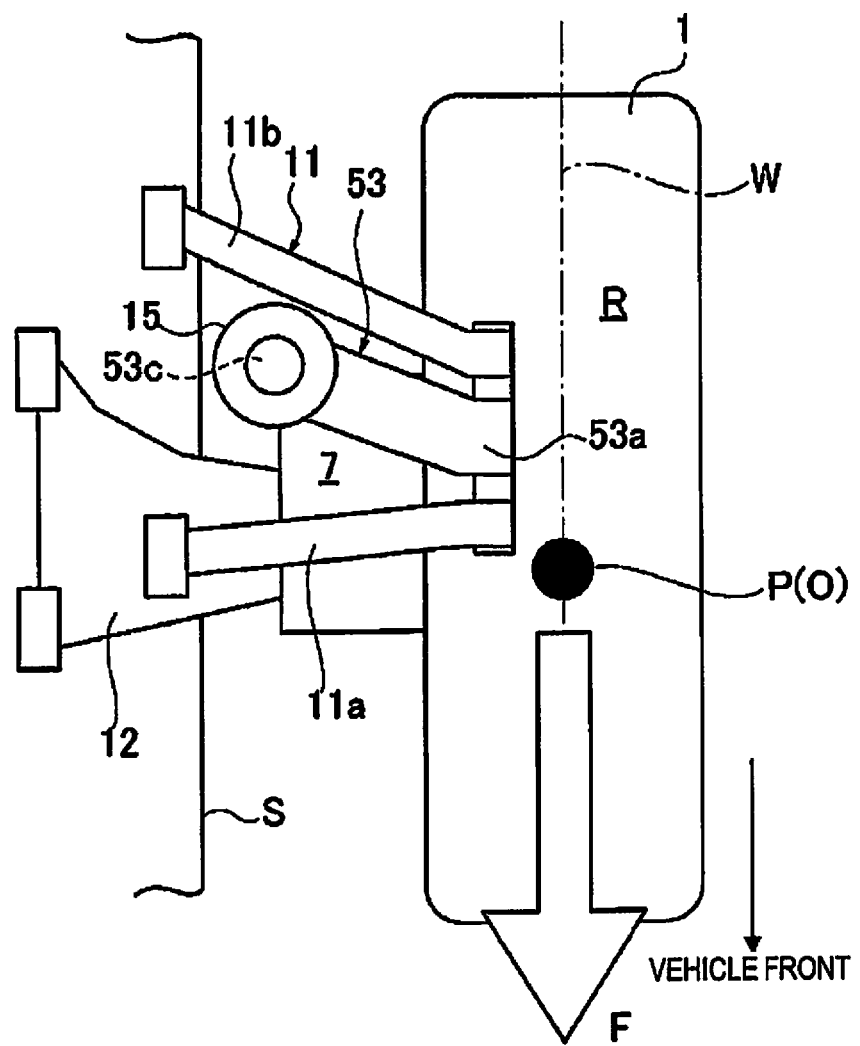
FIG. 13A is a plan view of an in-wheel motor driven wheel, when viewed from the top of the vehicle, to which a suspension device of the fifth embodiment is applied.
Figure 13B:
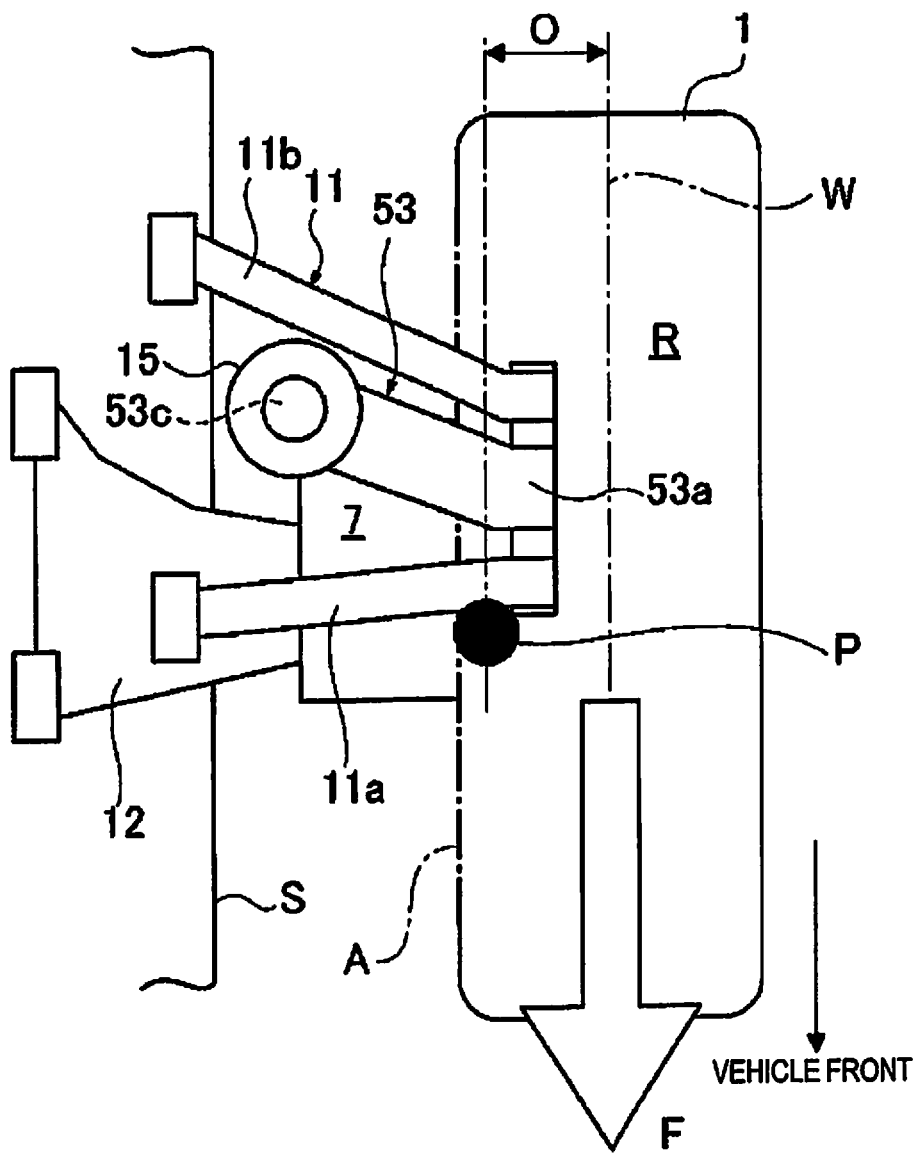
FIG. 13B is a plan view of an in-wheel motor driven wheel, when viewed from the top of the vehicle, of the Comparative Example in which the scrub radius is not equal to "0".

FIG. 12 is a front view of an in-wheel motor driven wheel, when viewed from the front of the vehicle, to which a suspension device of a fifth embodiment is applied. FIG. 13A is a plan view of an in-wheel motor driven wheel, when viewed from the top of the vehicle, to which a suspension device of the fifth embodiment is applied. Further, FIG. 13B is a plan view of an in-wheel motor driven wheel, when viewed from the top of the vehicle, of the Comparative Example in which the scrub radius is not equal to "0". Also, regarding the same structure as in the first embodiment, the same reference numeral is attached and detailed description thereof will be omitted.

In the suspension device of the fifth embodiment, in the same manner as in the first embodiment, the suspension structure member 10 includes an upper suspension arm 11 that supports the wheel 1 at a vehicle upper position higher than the axle Q, a lower suspension arm 12 that supports the wheel at the vehicle bottom position lower than the axle Q, and a third link 53 (link member).

Further, the third link 53 includes an arm connecting portion 53a, a wheel supporting portion 53b, and a shock absorber connecting portion 53c. The wheel 1 is connected to the upper suspension arm 11 and the shock absorber 15 via the third link 53. Also, as shown in FIG. 12, the shock absorber connecting portion 53c is disposed in the vehicle bottom position lower than the upper end surface 8a of the in-wheel motor unit 7.

Furthermore, in the suspension device in the fifth embodiment, the kingpin axis P positioned in a line connecting the kingpin rotating portion 6a formed in the knuckle 3 and the lower arm supporting portion 6b is positioned such that a scrub radius will be "zero".

Here, the wheel supporting portion 53b of the third link 53 is connected to the kingpin rotating portion 6a. Also, the lower arm supporting portion 6b represents a supporting position in which the wheel 1 is supported by the lower suspension arm 12. In other words, "the kingpin axis P" will be defined by the wheel supporting portion 53b and the supporting position in which the wheel 1 is supported by the lower suspension arm 12. Further, "the scrub radius" refers to, when viewed from the vehicle front (the state shown in FIG. 12), a distance between the ground contact center of the tire 1a and a crossing point at which the kingpin axis P intersects with the road surface G. Note that, since the scrub radius is reduced to "zero" in FIG. 12, the scrub radius is shown by point O. Also note that "reducing the scrub radius to zero" does not only refers to strict "zero", but is intended to allow a negligible error.

As described above, in the suspension device in the fifth embodiment, since the kingpin axis P is positioned such that the scrub radius will be set to "zero", it is possible to reduce the torque generated about the kingpin axis P to approximately "zero". In other words, the driving force (braking force) F imparted to the wheel 1 by the in-wheel motor unit 7 is input to the ground contact point W of the tire 1a. On the other hand, the torque generated about the kingpin axis P is acquired by multiplying the driving force (braking force) input at the ground contact point and the scrub radius.

Thus, when reducing the scrub radius to "zero", the torque that is generated about the kingpin axis P will be roughly "zero".

As shown in FIG. 13B, when the crossing point at which the kingpin axis P intersects with the road surface G and is thus shifted from the ground contact center of the tire 1a, i.e., when the scrub radius O is not equal to "zero", the torque about the kingpin axis P may not be reduced to "zero". Since the suspension devices for supporting the associated left and right wheel 1 are bisymmetrical, when no difference in driving force (braking force) between the left and right wheels 1 is generated (i.e., when the driving or braking forces of the left and right wheels are strictly equal), then the torques respectively generated about the kingpin axis on the left and right wheels will be cancelled so as to reduce the disturbance to a steering-rack axial force to "zero". However, between the left and right wheels 1, due to a wheel load fluctuation of the left and right wheels 1 that occurs during traveling, independent left and right traction control, anti-lock brake control, influence of the yaw moment control, and the like, the difference in the driving force (braking force) will occur in many scenes. Further, due to this difference of driving force (braking force) in the left and right wheels, the torques about the left and right kingpin axis P will be different from each other so that disturbance on the steering-rack axial force or a torque steer may generate. Thus, under the given condition of driving and braking forces, a problem may arise that the disturbance to the steering-rack axial force and the like will be substantial.

To cope with this situation, by reducing the torque about the kingpin axis P to "zero", even when a difference in driving force (braking force) generates between the left and right wheels, it is possible to suppress the disturbance on the steering-rack axial force or torque steer.

Now, a description is given of the effect. In a suspension device for an in-wheel motor driven wheel in the fifth embodiment, it is possible to achieve the effect below.

(8) The suspension structure member 10 is pivotally supported on the vehicle body S, and is disposed in the vehicle bottom position lower than the axle Q of the wheel 1, the suspension structure member further comprising a lower suspension arm that pivotally supports the wheel 1 in the vehicle bottom position lower than the axle Q, wherein the wheel supporting portion 53b is disposed in the vehicle upper position higher than the axle Q of the wheel 1, and wherein a kingpin axis P defined by the wheel supporting portion 53b and a supporting position (lower arm supporting position) at which the wheel 1 is supported by the lower suspension arm 12 is positioned such that a scrub radius will be "zero". Thus, the torque that will generate about the kingpin axis P may be reduced to "zero" to thereby suppress steer torque when the difference occurs in the driving and braking force imparted to the left and right wheels 1.

While the in-wheel motor driven wheel suspension device according to the present invention has been described based on the first to fifth embodiments, the specific configuration is not limited to these embodiments. Rather, without departing from the gist of the invention according to each claim pertaining to the scope of the claims, design change and addition are acceptable.

In the suspension devices of each embodiments described above, although the present invention is applied to a front wheel steering system. However, the present invention is not limited thereto, and may be applied to a driving wheel that is disposed in the rearward side of the vehicle body S. Here, in an in-wheel motor driven wheel of rear drive, when the lower end of the shock absorber is set to a high position away from the road surface, the upper end of the shock absorber protrudes into a cargo space that is formed in the vehicle rear part to thereby cause a problem that the cargo space will be small. In this connection, by applying the suspension device according to the present invention, it is possible to secure a sufficient stroke of the shock absorber while preventing the shock absorber from being intruded into cargo space or luggage compartment.

Further, each of the suspension devices described above relates to a double wishbone type. However, the present invention is not limited thereto, and may be applied to a suspension device of a single arm suspension, such as the trailing arm type.

Further, in each embodiment described above, the in-wheel motor unit 7, 7' is configured to accommodate the electric motor 71 and the reduction gear 72 (transmission) integrally. However, the electric motor and the reduction gear (transmission) may be separate from each other.

The invention claimed is:

1. A suspension device for an in-wheel motor driven wheel in which a wheel driven by an in-wheel motor unit is suspended on a vehicle body via a suspension structure member and a shock absorber, the suspension structure member comprising:
   a suspension arm disposed in the vehicle upper position higher than an axle of the wheel and pivotally supporting the wheel with respect to the vehicle body at the vehicle upper position higher than the axle;
   a lower suspension arm disposed in the vehicle bottom position lower than the axle of the wheel and pivotally supporting the wheel with respect to the vehicle body in the vehicle bottom position lower than the axle; and
   a link member having an arm connecting portion pivotally connecting a wheel side end portion of the upper suspension arm in the vertical direction, a wheel supporting portion pivotally supporting the wheel in a steering direction, and a shock absorber connecting portion connected to the lower end of the shock absorber such that the in-wheel motor unit is disposed between the shock absorber and the wheel, the shock absorber connecting portion being disposed in the vehicle bottom position lower than an upper end portion of the in-wheel motor unit.

2. The suspension device for the in-wheel motor driven wheel as claimed in claim 1, wherein
   the wheel includes a rim to support the tire and a wheel disc connected to the in-wheel motor unit, and the wheel supporting portion is disposed in a position away from the wheel inner side area enclosed by the rim and the wheel disc.

3. The suspension device for the in-wheel motor driven wheel as claimed in claim 1, wherein
   the shock absorber connecting portion is disposed in a position between the vehicle body and the vehicle body-side end portion of the in-wheel motor unit.

4. The suspension device for the in-wheel motor driven wheel as claimed in claim 1, wherein
   the shock absorber connecting portion is disposed in the vehicle rearward position of the rear end portion of the in-wheel motor unit.

5. The suspension device for the in-wheel motor driven wheel as claimed in claim 1, wherein
   he in-wheel motor unit includes a rotating electrical machine, an output shaft of the rotating machine being offset with respect to the axle of the wheel, and the wheel supporting portion is disposed in the vehicle forward position of the shock absorber connecting portion, in the lateral outside position, and in the vehicle rearward position of the output shaft of the rotating machine.

6. The suspension device for the in-wheel motor driven wheel as claimed in claim 5, wherein
a vehicle longitudinal dimension between the shock absorber connecting portion and the wheel supporting portion is shorter than a lateral dimension between the shock absorber connecting portion and the wheel supporting portion.

7. The suspension device for the in-wheel motor driven wheel as claimed in claim 1, wherein
the wheel supporting portion is disposed in a lateral outside position of the shock absorber connecting portion with respect to the vehicle longitudinal centerline and in a vehicle bottom position lower than the arm connecting portion.

8. The suspension device for the in-wheel motor driven wheel as claimed in claim 7, wherein
the wheel supporting portion is disposed in the vehicle upper position higher than the axle of the wheel, and a kingpin axis defined by the wheel supporting portion and a supporting position at which the wheel is supported by the lower suspension arm is positioned such that a scrub radius will be zero.

9. The suspension device for the in-wheel motor driven wheel as claimed in claim 2, wherein
the shock absorber connecting portion is disposed in a position between the vehicle body and the vehicle body-side end portion of the in-wheel motor unit.

10. The suspension device for the in-wheel motor driven wheel as claimed in claim 2, wherein
the shock absorber connecting portion is disposed in the vehicle rearward position of the rear end portion of the in-wheel motor unit.

11. The suspension device for the in-wheel motor driven wheel as claimed in claim 3, wherein
the shock absorber connecting portion is disposed in the vehicle rearward position of the rear end portion of the in-wheel motor unit.

12. The suspension device for the in-wheel motor driven wheel as claimed in claim 2, wherein
the in-wheel motor unit includes a rotating electrical machine, the output shaft of the rotating machine being offset with respect to the axle of the wheel, and the wheel supporting portion is disposed in the vehicle forward position of the shock absorber connecting portion, in the lateral outside position, and in the vehicle rearward position of the output shaft of the rotating machine.

13. The suspension device for the in-wheel motor driven wheel as claimed in claim 3, wherein
the in-wheel motor unit includes a rotating electrical machine, the output shaft of the rotating machine being offset with respect to the axle of the wheel, and the wheel supporting portion is disposed in the vehicle forward position of the shock absorber connecting portion, in the lateral outside position, and in the vehicle rearward position of the output shaft of the rotating machine.

14. The suspension device for the in-wheel motor driven wheel as claimed in claim 4, wherein
the in-wheel motor unit includes a rotating electrical machine, the output shaft of the rotating machine being offset with respect to the axle of the wheel, and the wheel supporting portion is disposed in the vehicle forward position of the shock absorber connecting portion, in the lateral outside position, and in the vehicle rearward position of the output shaft of the rotating machine.

15. The suspension device for the in-wheel motor driven wheel as claimed in claim 2, wherein
the wheel supporting portion is disposed in a lateral outside position of the shock absorber connecting portion with respect to the vehicle longitudinal centerline and in a vehicle bottom position lower than the arm connecting portion.

16. The suspension device for the in-wheel motor driven wheel as claimed in claim 3, wherein
the wheel supporting portion is disposed in a lateral outside position of the shock absorber connecting portion with respect to the vehicle longitudinal centerline and in a vehicle bottom position lower than the arm connecting portion.

17. The suspension device for the in-wheel motor driven wheel as claimed in claim 4, wherein
the wheel supporting portion is disposed in a lateral outside position of the shock absorber connecting portion with respect to the vehicle longitudinal centerline and in a vehicle bottom position lower than the arm connecting portion.

18. The suspension device for the in-wheel motor driven wheel as claimed in claim 5, wherein
the wheel supporting portion is disposed in a lateral outside position of the shock absorber connecting portion with respect to the vehicle longitudinal centerline and in a vehicle bottom position lower than the arm connecting portion.

19. The suspension device for the in-wheel motor driven wheel as claimed in claim 6, wherein
the wheel supporting portion is disposed in a lateral outside position of the shock absorber connecting portion with respect to the vehicle longitudinal centerline and in a vehicle bottom position lower than the arm connecting portion.

20. The suspension device for the in-wheel motor driven wheel as claimed in claim 1, wherein
the shock absorber connecting portion is disposed at a first end of the link member and the arm connecting portion is disposed at a second end of the link member.

21. The suspension device for the in-wheel motor driven wheel as claimed in claim 1, wherein
the shock absorber connecting portion is disposed at the lowest position of the link member.

* * * * *